(12) United States Patent
Wang et al.

(10) Patent No.: US 12,517,404 B2
(45) Date of Patent: Jan. 6, 2026

(54) DISPLAY PANEL AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Baoqiang Wang, Beijing (CN); Xu Xu, Beijing (CN); Wenchao Wang, Beijing (CN); Shanshan Xu, Beijing (CN); Jinliang Wang, Beijing (CN); Xin Fang, Beijing (CN); Jixiang Chen, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/687,586

(22) PCT Filed: Oct. 19, 2021

(86) PCT No.: PCT/CN2021/124675
§ 371 (c)(1),
(2) Date: Feb. 28, 2024

(87) PCT Pub. No.: WO2023/065111
PCT Pub. Date: Apr. 27, 2023

(65) Prior Publication Data
US 2024/0353722 A1 Oct. 24, 2024

(51) Int. Cl.
G02F 1/1362 (2006.01)
H10D 86/40 (2025.01)
H10D 86/60 (2025.01)

(52) U.S. Cl.
CPC .. *G02F 1/136286* (2013.01); *G02F 1/136222* (2021.01); *H10D 86/441* (2025.01); *H10D 86/60* (2025.01)

(58) Field of Classification Search
CPC ......... G02F 1/136286; G02F 1/136222; G02F 1/134309; H01L 27/124; H10D 86/441; H10D 86/60
See application file for complete search history.

(56) References Cited

U.S. PATENT DOCUMENTS 8,711,295 B2 4/2014 Kawashima et al.
11,054,704 B2 7/2021 Ikeno
(Continued)

FOREIGN PATENT DOCUMENTS

CN 202710885 U 1/2013
CN 105974686 A 9/2016
(Continued)

OTHER PUBLICATIONS

CN 111103734 machine translation (Year: 2020).*
(Continued)

*Primary Examiner* — James A Dudek
(74) *Attorney, Agent, or Firm* — Workman Nydegger

(57) ABSTRACT

Embodiments of the present disclosure provide a display panel and a display device. The display panel comprises: a base substrate having multiple rows and multiple columns of sub-pixels; and a pixel electrode layer located on the base substrate, the pixel electrode layer comprising a plurality of pixel electrodes arranged apart from each other, and one sub-pixel comprising one pixel electrode, wherein the pixel electrode comprises: a first electrode strip and comb structures respectively connected to both sides of the first elec-
(Continued)

trode strip, each comb structure consisting of a plurality of second electrode strips and a plurality of slits arranged alternately.

19 Claims, 24 Drawing Sheets

(56) References Cited

U.S. PATENT DOCUMENTS

| | | |
|---|---|---|
| 2008/0084529 A1 | 4/2008 | Wang et al. |
| 2012/0127416 A1 | 5/2012 | Morishita et al. |
| 2016/0282682 A1* | 9/2016 | Kim ................. G02F 1/133753 |

FOREIGN PATENT DOCUMENTS

| | | |
|---|---|---|
| CN | 106371256 A | 2/2017 |
| CN | 109799659 A | 5/2019 |
| CN | 111103734 A | 5/2020 |
| CN | 112731708 A | 4/2021 |
| CN | 112859463 A | 5/2021 |
| JP | 2002244159 A | 8/2002 |

OTHER PUBLICATIONS

CN 207380420 U (Cheng, Hong-fei et al.) machine translation (Year: 2018).*
International Search Report, mailed May 26, 2022, from PCT International Application No. PCT/CN2021/124675, 4 pages.
Chinese First Office Action, mailed Nov. 8, 2024, from Chinese App. No. 202180002977.5, 14 pages.

* cited by examiner

DISPLAY PANEL AND DISPLAY DEVICE

CROSS-REFERENCE TO RELATED APPLICATION

This application is a national phase entry under 35 U.S.C § 371 of International Application No. PCT/CN2021/124675, filed on Oct. 19, 2021, the entire content of which is incorporated herein by reference.

TECHNICAL FIELD

The present disclosure relates to the field of display technologies, and in particular, to a display panel and a display device.

BACKGROUND

In recent years, the field of 3D display has developed rapidly. Here, a grating type 3D display device has attracted much attention due to its advantages such as simple manufacturing process and low crosstalk. Generally, the grating type 3D display device includes a display panel and a grating, and viewer's left eye and right eye respectively obtain a left-eye view and a right-eye view displayed on the display panel through the grating to form a 3D display image.

SUMMARY

Embodiments of the present disclosure provide a display panel and a display device for improving display effect.

Embodiments of the present disclosure provide a display panel, including:
- a base substrate, having multiple rows and multiple columns of sub-pixels;
- a pixel electrode layer, located on the base substrate, where the pixel electrode layer includes a plurality of pixel electrodes arranged at intervals, and one sub-pixel includes one pixel electrode; where,
- each pixel electrode includes: a first electrode strip, and comb structures respectively connected to both sides of the first electrode strip; and the comb structures are composed of a plurality of second electrode strips and a plurality of slits arranged alternately.

Optionally, in the above display panel provided by the embodiments of the present disclosure, a shape of the first electrode strip is a folded line shape.

Optionally, in the above display panel provided by the embodiments of the present disclosure, the first electrode strip is divided into a first sub-electrode strip and a second sub-electrode strip along a bending point; and
  the second electrode strips on both sides of the first sub-electrode strip are in one-to-one correspondence and are located on a same straight line, and the second electrode strips on both sides of the second sub-electrode strip are in one-to-one correspondence and are located on a same straight line.

Optionally, in the above display panel provided by the embodiments of the present disclosure, the second electrode strips connected with the first sub-electrode strip are approximately parallel, and the second electrode strips connected with the second sub-electrode strip are approximately parallel.

Optionally, in the above display panel provided by the embodiments of the present disclosure, the second electrode strips connected with the first sub-electrode strip have a first inclination angle to a row direction, the second electrode strips connected with the second sub-electrode strip have a second inclination angle to the row direction, and the first inclination angle and the second inclination angle are supplementary angles.

Optionally, in the above display panel provided by the embodiments of the present disclosure, each pixel electrode has a center line extending along a row direction, and the bending point is substantially located on the center line.

Optionally, in the above display panel provided by the embodiments of the present disclosure, the first electrode strip has a bending angle at a position corresponding to the bending point, and on a side of the bending angle and at a position close to the bending point, the plurality of second electrode strips correspondingly connected with the first sub-electrode strip and the plurality of second electrode strips correspondingly connected with the second sub-electrode strip are electrically connected;
  on opposite sides of the bending angle and at two side edges away from the bending point, the plurality of second electrode strips correspondingly connected to the first sub-electrode strip are electrically connected, and the plurality of second electrode strips correspondingly connected to the second sub-electrode strip are electrically connected; and
  ends, far away from the first electrode strip, of the second electrode strips at other positions are independent from each other.

Optionally, in the above display panel provided by the embodiments of the present disclosure, the display panel further includes data lines between the base substrate and the pixel electrode layer, where orthographic projections of the data lines on the base substrate and orthographic projections of effective light-emitting areas of the sub-pixels on the base substrate have an overlapping area, and a shape of the overlapping area is a folded line shape.

Optionally, in the above display panel provided by the embodiments of the present disclosure, an orthographic projection of the first electrode strip on the base substrate substantially overlaps an orthographic projection of the overlapping area on the base substrate.

Optionally, in the above display panel provided by the embodiments of the present disclosure, the overlapping area forms an isosceles triangle with a column direction.

Optionally, in the above display panel provided by the embodiments of the present disclosure, a bending angle of the overlapping area is larger than 90° and smaller than 180°.

Optionally, in the above display panel provided by the embodiments of the present disclosure, one column of the sub-pixels corresponds to one data line;
  each data line includes a first sub-data line and a second sub-data line electrically connected with each other;
  an orthographic projection of the first sub-data line on the base substrate and an orthographic projection of an effective light-emitting area of a corresponding sub-pixel on the base substrate form the overlapping area; and
  an orthographic projection of the second sub-data line on the base substrate does not overlap with an orthographic projection of each effective light-emitting area on the base substrate.

Optionally, in the above display panel provided by the embodiments of the present disclosure, the display panel further includes: a first insulating layer between the data lines and the pixel electrode layer, a common electrode layer between the first insulating layer and the pixel electrode layer, and a second insulating layer between the common electrode layer and the pixel electrode layer; where, the common electrode layer has a planar structure.

Optionally, in the above display panel provided by the embodiments of the present disclosure, the data lines include a plurality of first-type data lines and a plurality of second-type data lines; the first-type data lines and the second-type data lines are alternately arranged along a row direction of the sub-pixels; and two adjacent columns of sub-pixels are taken as a column group, and every two adjacent column groups correspond to one first-type data line; where in every two adjacent column groups, and odd numbered row of sub-pixels of a first column group are electrically connected with the corresponding first-type data line, and an even numbered row of sub-pixels of a second column group are electrically connected with the corresponding first-type data line.

Optionally, in the above display panel provided by the embodiments of the present disclosure, the display panel further includes: a plurality of gate lines located between the data lines and the base substrate and insulated and intersected with the data lines, a third insulating layer located between the data lines and the gate lines, and common electrode connection lines arranged at intervals on a same layer as the gate lines; where the gate lines extend along the row direction of the sub-pixels, one row of the sub-pixels corresponds to two gate lines; the common electrode connection lines extend along the row direction of the sub-pixels, and orthographic projections of the common electrode connection lines on the base substrate do not overlap with the orthographic projections of the effective light-emitting areas on the base substrate; and the common electrode connection lines are electrically connected with each of the second-type data lines through via holes penetrating the third insulating layer, and the second-type data lines are connected with the common electrode layer through via holes penetrating the first insulating layer.

Optionally, in the above display panel provided by the embodiments of the present disclosure, the display panel further includes a color resistor layer located between the data lines and the first insulating layer, and the color resistor layer includes a plurality of color resistors arranged corresponding to the sub-pixels.

Optionally, in the above display panel provided by the embodiments of the present disclosure, the sub-pixels located in the same column are electrically connected with the same data line, and the sub-pixels located in different columns are electrically connected with different data lines.

Optionally, in the above display panel provided by the embodiments of the present disclosure, the display panel further includes: a plurality of gate lines located between the data lines and the base substrate and insulated and intersected with the data lines, and a third insulating layer located between the data lines and the gate lines, and common electrode connection lines arranged at intervals on the same layer as the gate lines; where, the gate lines extend along the row direction of the sub pixels, and one row of the sub pixels corresponds to one gate line; the common electrode connection lines extend along the row direction of the sub pixels, and orthographic projections of the common electrode connection lines on the base substrate do not overlap with the orthographic projections of the effective light-emitting areas on the base substrate; and the common electrode layer is electrically connected to each common electrode connection line through via holes that sequentially penetrate through the first insulating layer and the third insulating layer.

Optionally, in the above display panel provided by the embodiments of the present disclosure, the display panel further includes: an opposite substrate disposed opposite to the base substrate, and a liquid crystal packaged between the base substrate and the opposite substrate; a color resistor layer is provided on the opposite substrate, and the color resistor layer includes a plurality of color resistors corresponding to the sub-pixels.

Correspondingly, the embodiments of the present disclosure further provide a display device, including the display panel described in any one of the foregoing embodiments provided by the present disclosure.

Optionally, the above display device provided by the embodiments of the present disclosure further includes: a grating located at a light emitting side of the display panel.

BRIEF DESCRIPTION OF FIGURES

In order to more clearly illustrate the technical solutions in the embodiments of the present disclosure, the drawings used in the description of the embodiments will be briefly introduced below. Obviously, the drawings in the following description are only some embodiments of the present disclosure. Those of ordinary skill in the art can also obtain other drawings based on these drawings without making creative efforts.

DETAILED DESCRIPTION

Figure 1:
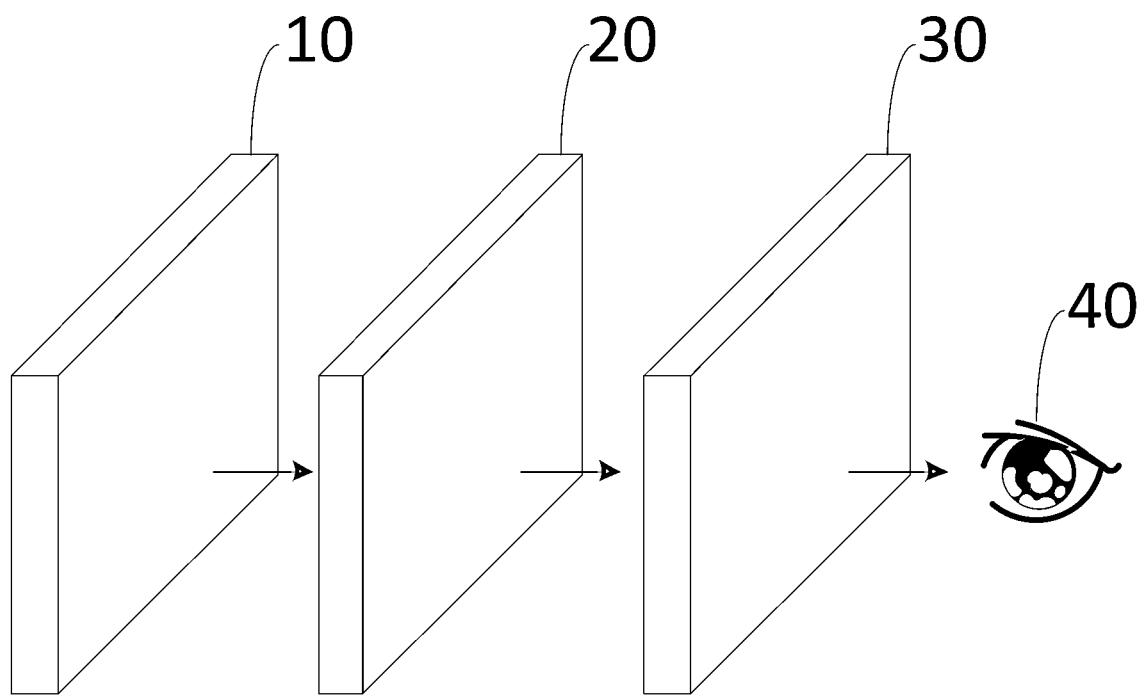
FIG. 1 is a schematic structural diagram of a naked-eye 3D display device.

In order to make the purpose, technical solutions and advantages of the embodiments of the present disclosure clearer, the technical solutions of the embodiments of the present disclosure will be clearly and completely described below in conjunction with the drawings of the embodiments of the present disclosure. Apparently, the described embodiments are some but not all of the embodiments of the present disclosure. And in the case of no conflict, the embodiments in the present disclosure and the features in the embodiments can be combined with each other. Based on the described embodiments of the present disclosure, all other embodiments obtained by persons of ordinary skill in the art without creative effort fall within the protection scope of the present disclosure.

Unless otherwise defined, the technical terms or scientific terms used in the present disclosure shall have the usual meanings understood by those skilled in the art to which the present disclosure belongs. "First", "second" and similar words used in the present disclosure do not indicate any order, quantity or importance, but are only used to distinguish different components. "Comprising" or "including" and similar words mean that the elements or items appearing before the word include the elements or items listed after the word and their equivalents, without excluding other elements or items. Words such as "connected" or "in connection with" are not limited to physical or mechanical connections, but may include electrical connections, whether direct or indirect.

It should be noted that the size and shape of each figure in the drawings do not reflect the true scale, but are only intended to illustrate the present disclosure. And the same or similar reference numerals represent the same or similar elements or elements having the same or similar functions throughout.

As shown in FIG. 1, a naked-eye 3D display device adopts a combined superposition mode of a light source 10, a display panel 20 and a grating 30. Here, the display panel 20 receives an external signal to display a two-dimensional picture; then the parallax is realized through the refraction of the grating 30 in front of the screen to form a three-dimensional effect, so as to enable a viewer 40 to see 3D images.

When a grating-type naked-eye 3D display device is used, due to the process of the display panel or other factors, the formed 3D display image will have moiré, which will affect the 3D display effect.

Figure 2:
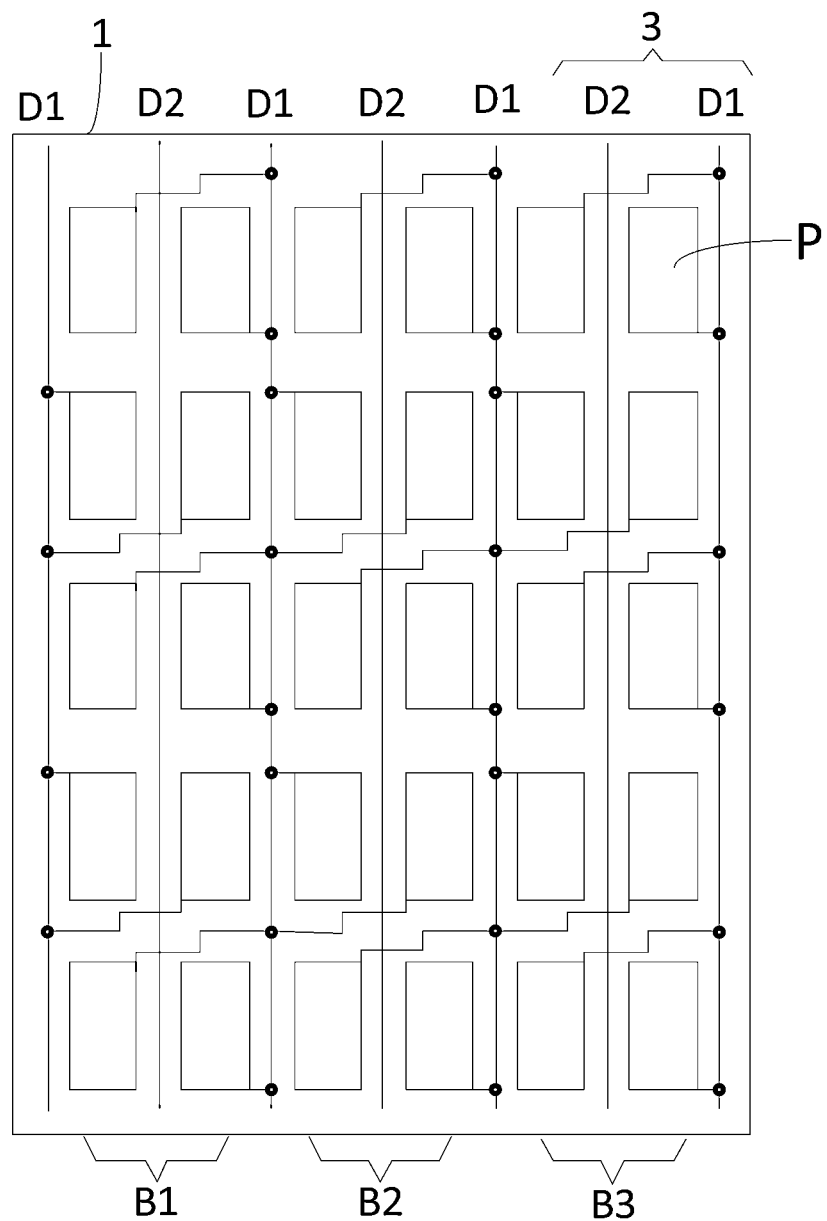
FIG. 2 is a simple schematic structural diagram of a display panel according to an embodiment of the present disclosure.
Figure 3:
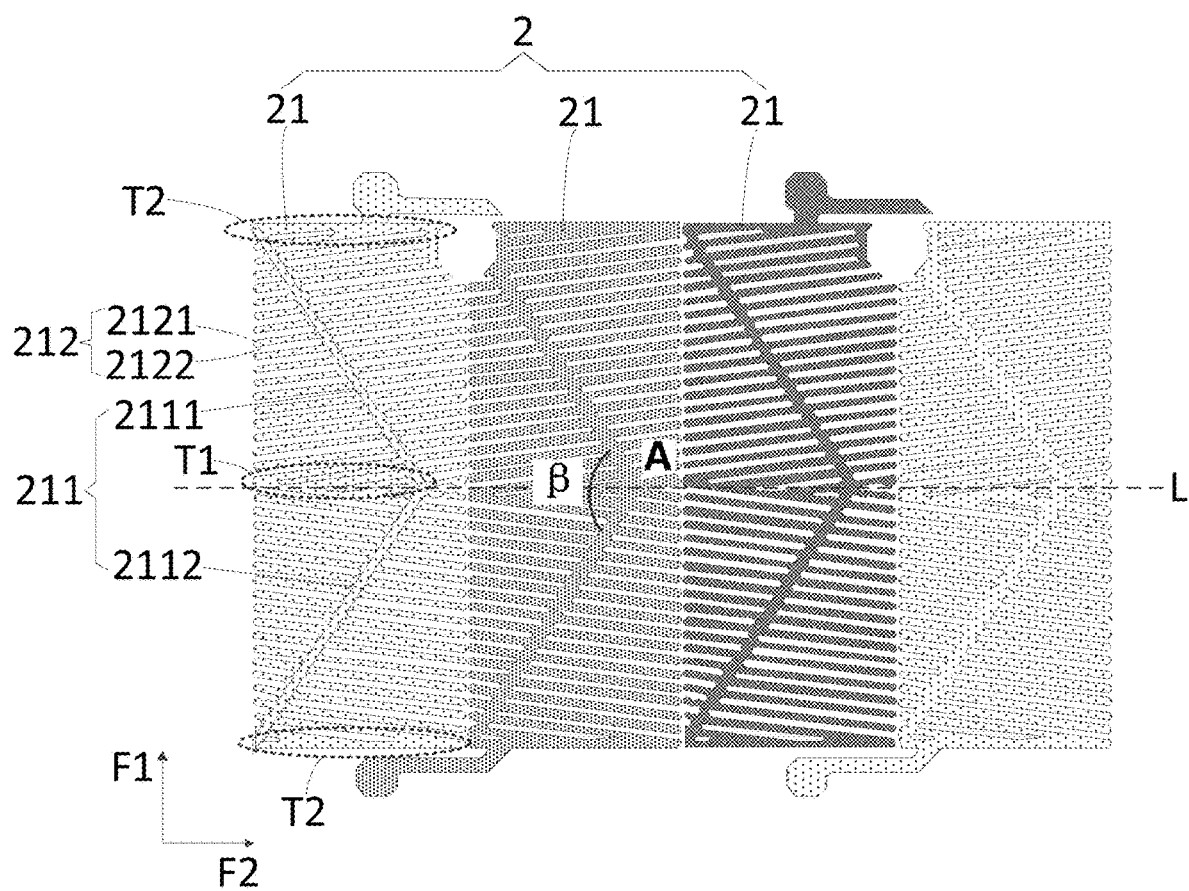
FIG. 3 is a schematic diagram of a specific structure of a pixel electrode of a display panel according to an embodiment of the present disclosure.

Embodiments of the present disclosure provide a display panel, as shown in FIG. 2 and FIG. 3, which may include:
- a base substrate 1, having multiple rows and multiple columns of sub-pixels P;
- a pixel electrode layer 2, located on the base substrate 1, where the pixel electrode layer 2 includes a plurality of pixel electrodes 21 arranged at intervals from each other, and one sub-pixel P includes one pixel electrode 21;
- each pixel electrode 21 includes: a first electrode strip 211, and comb structures 212 respectively connected to both sides of the first electrode strip 211; the comb structures 212 are composed of a plurality of second electrode strips 2121 and a plurality of slits 2122 arranged alternately.

Figure 4:
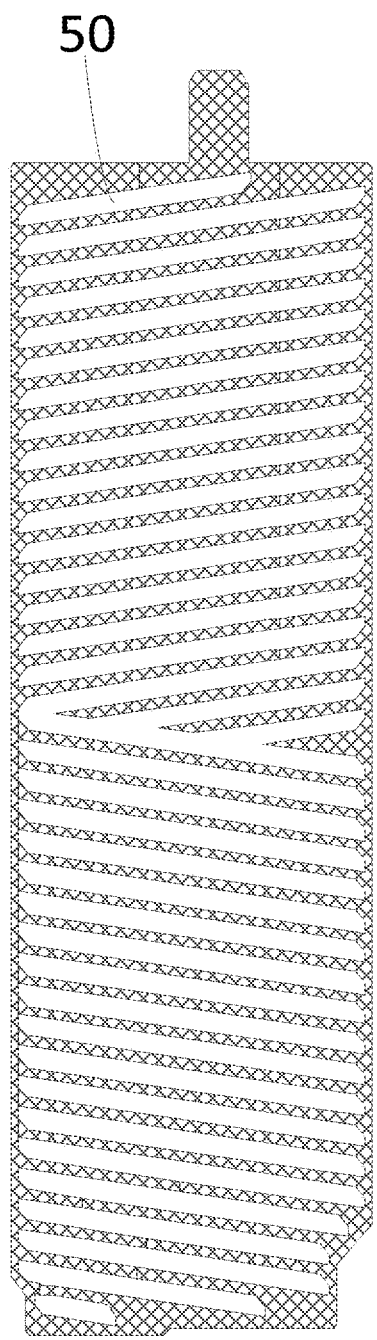
FIG. 4 is a schematic diagram of a specific structure of a pixel electrode according to the related art.

Liquid crystal display (LCD) panels are widely used due to their thin and light appearance, power saving, and no radiation. The working principle of the LCD panel is to change an arrangement state of liquid crystal molecules in a liquid crystal layer by changing a voltage difference between two ends of the liquid crystal layer, so as to change light transmittance of the liquid crystal layer to display images. During specific implementation, the display panel in the embodiments of the present disclosure may be a liquid crystal display panel. For the liquid crystal display panel, a traditional pixel electrode structure design is shown in FIG. 4. Edges of a pixel electrode are surrounded by an electrode skeleton (used for transmitting signals). There are multiple horizontal slits 50 inside the pixel electrode, and the liquid crystals are arranged along the slits 50; however, when the liquid crystals reach the edges of the pixel electrode, due to the structure of the electrode skeleton, the liquid crystal arrangement on the edges of the pixel electrode is disordered to form a dark area; therefore, there is a large dark area between adjacent sub-pixels. The inventors of the present disclosure studied and found that an average width of the display dark area between adjacent sub-pixels is about 21 μm, which is not conducive to the elimination of moiré. In the above display panel provided by the embodiments of the present disclosure, the pixel electrode is set to include the first electrode strip and comb structures respectively connected to both sides of the first electrode strip, and the comb structures are composed of a plurality of second electrode strips and a plurality of slits arranged alternately, so that there is no electrode skeleton on the edge of the pixel electrode structure provided by the present disclosure, but the electrode skeleton (the first electrode strip) is moved to the inside of the sub-pixel, that is, the edge of the pixel electrode structure is an open comb structure, so that the liquid crystals on the edge of the pixel electrode can be arranged in an orderly manner, so that the display dark area between the sub-pixels can be reduced, and when the display panel provided by the embodiments of the present disclosure is applied to a 3D display device, moiré can be reduced and the display effect can be improved.

During specific implementation, in the embodiments of the present disclosure, the display panel may include a display area, and the display area may include a plurality of pixel units arranged in an array. Each pixel unit includes a plurality of sub-pixels P. Exemplarily, the pixel unit may include a red sub-pixel(s), a green sub-pixel(s) and a blue sub-pixel(s), so that color mixing can be performed through red, green and blue to realize color display. Alternatively, the pixel unit may also include a red sub-pixel(s), a green sub-pixel(s), a blue sub-pixel(s) and a white sub-pixel(s), so that color mixing can be performed through red, green, blue and white to achieve color display. Of course, in practical applications, the luminous color of the sub-pixels in the pixel unit can be designed and determined according to the practical application environment, which is not limited here.

During specific implementation, in the above display panel provided by the embodiments of the present disclosure, as shown in FIG. 3, the first electrode strip 211 is shaped in the form of a folded line, and the folded line shaped first electrode strip 211 can avoid moiré caused by the interference with gratings of the 3D display device, which can further eliminate the moiré in the display screen and improve the display effect.

During specific implementation, in the above display panel provided by the embodiments of the present disclosure, as shown in FIG. 3, the first electrode strip 211 is divided into a first sub-electrode strip 2111 and a second sub-electrode strip 2112 along a bending point A; and
- the second electrode strips 2121 on both sides of the first sub-electrode strip 2111 are in one-to-one correspondence and located on the same straight line, and the second electrode strips 2121 on both sides of the second sub-electrode strip 2112 are in one-to-one correspondence and located on the same straight line. This is beneficial to the regular arrangement of the liquid crystal molecules and improves the display effect.

During specific implementation, in the above display panel provided by the embodiments of the present disclosure, as shown in FIG. 3, the second electrode strips 2121 connected with the first sub-electrode strip 2111 are approximately parallel, and the second electrode strips 2121 connected with the second sub-electrode strip 2112 are approximately parallel. In this way, when the liquid crystal display panel is displaying, all the liquid crystal molecules can be regularly arranged, to improve the display effect.

Figure 5:
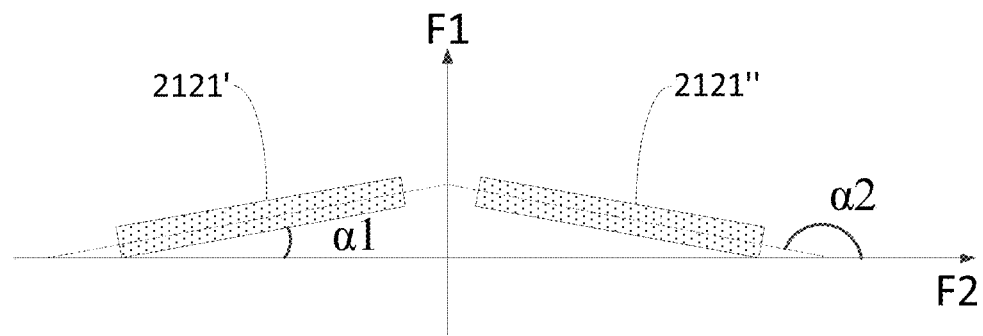
FIG. 5 is a schematic diagram of an inclination angle of a second electrode strip according to an embodiment of the present disclosure.

During specific implementation, in the above display panel provided by the embodiments of the present disclosure, as shown in FIG. 5, the second electrode strip 2121 (indicated by 2121' in FIG. 5) connected with the first sub-electrode strip 2111 has a first inclination angle α1 to a row direction F2, the second electrode strip 2121 (denoted by 2121" in FIG. 5) connected with the second sub-electrode strip 2112 has a second inclination angle α2 to the row direction F2, the first inclination angle α1 and the second inclination angle α2 are supplementary angles. The pixel electrodes in the same sub-pixel have second electrode strips 2121 with supplementary inclination angles. In this arrangement, the luminance of the same sub-pixel can be supplementary, so that horizontal stripes can be avoided.

During specific implementation, in the display panel provided by the embodiments of the present disclosure, as shown in FIG. 3, the pixel electrode 21 has a centerline L extending along the row direction F2, and the bending point A is roughly located on the centerline L. Due to the influence of the manufacturing process, the position of the bending point A may have a certain error with the centerline L, and this structure can maximize the improvement of moiré defects.

During specific implementation, in the above display panel provided by the embodiments of the present disclosure, as shown in FIG. 3, the first electrode strip 211 has a bending angle β at a position corresponding to the bending point A. On a side of the bending angle β and at a position close to the bending point A (i.e., at the oval dotted line frame T1), the plurality of second electrode strips 2121 correspondingly connected with the first sub-electrode strip 2111 and the plurality of second electrode strips 2121 correspondingly connected with the second sub-electrode strip 2112 are electrically connected with each other;

on opposite sides of the bending angle β and at both edges away from the bending point A (i.e., at the oval dotted line frames T2), the plurality of second electrode strips 2121 correspondingly connected with the first sub-electrode strip 2111 are electrically connected with each other, and the plurality of second electrode strips 2121 correspondingly connected to the second sub-electrode strip 2112 are electrically connected with each other; and ends, far away from the first electrode strip 211, of the second electrode strips 2121 at other positions are independent from each other. That is, the edges of the pixel electrode structure are set as an open comb structure, so that the orderly arrangement of liquid crystals on the edge of the pixel electrodes can be realized, and display dark areas between sub-pixels may be reduced, to thereby reduce moiré, and improve display effects.

Figure 6A:
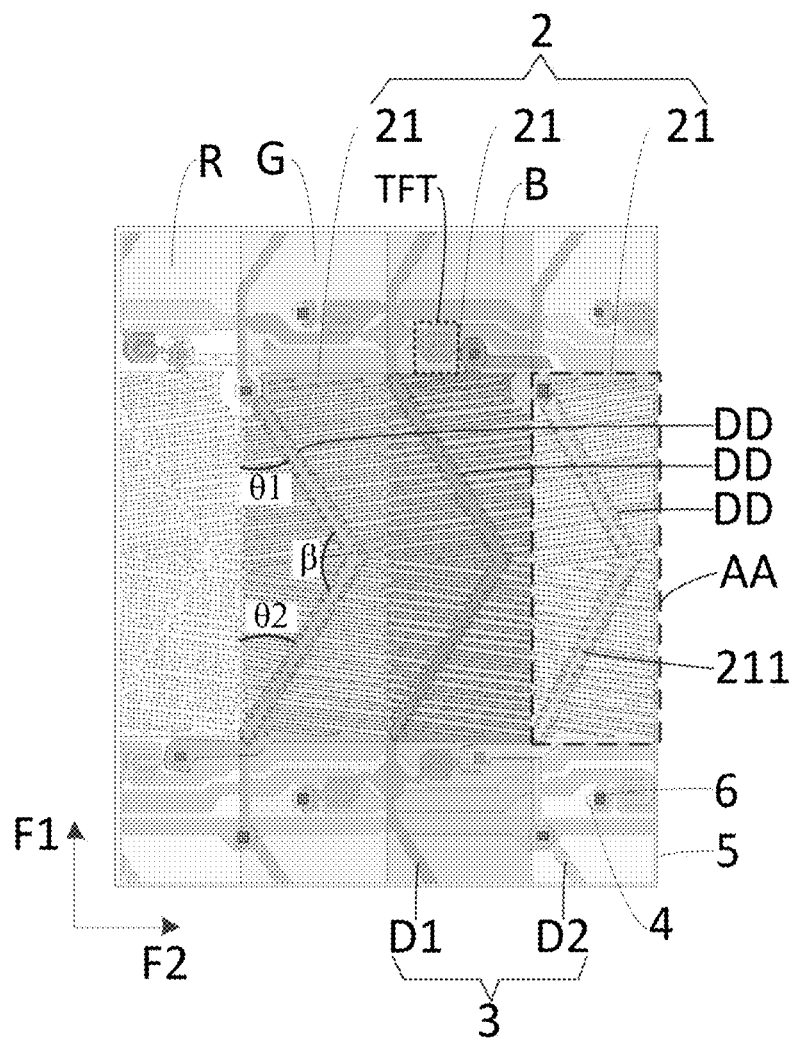
FIG. 6A is a schematic diagram of some specific structures of a display panel according to an embodiment of the present disclosure.
Figure 7A:
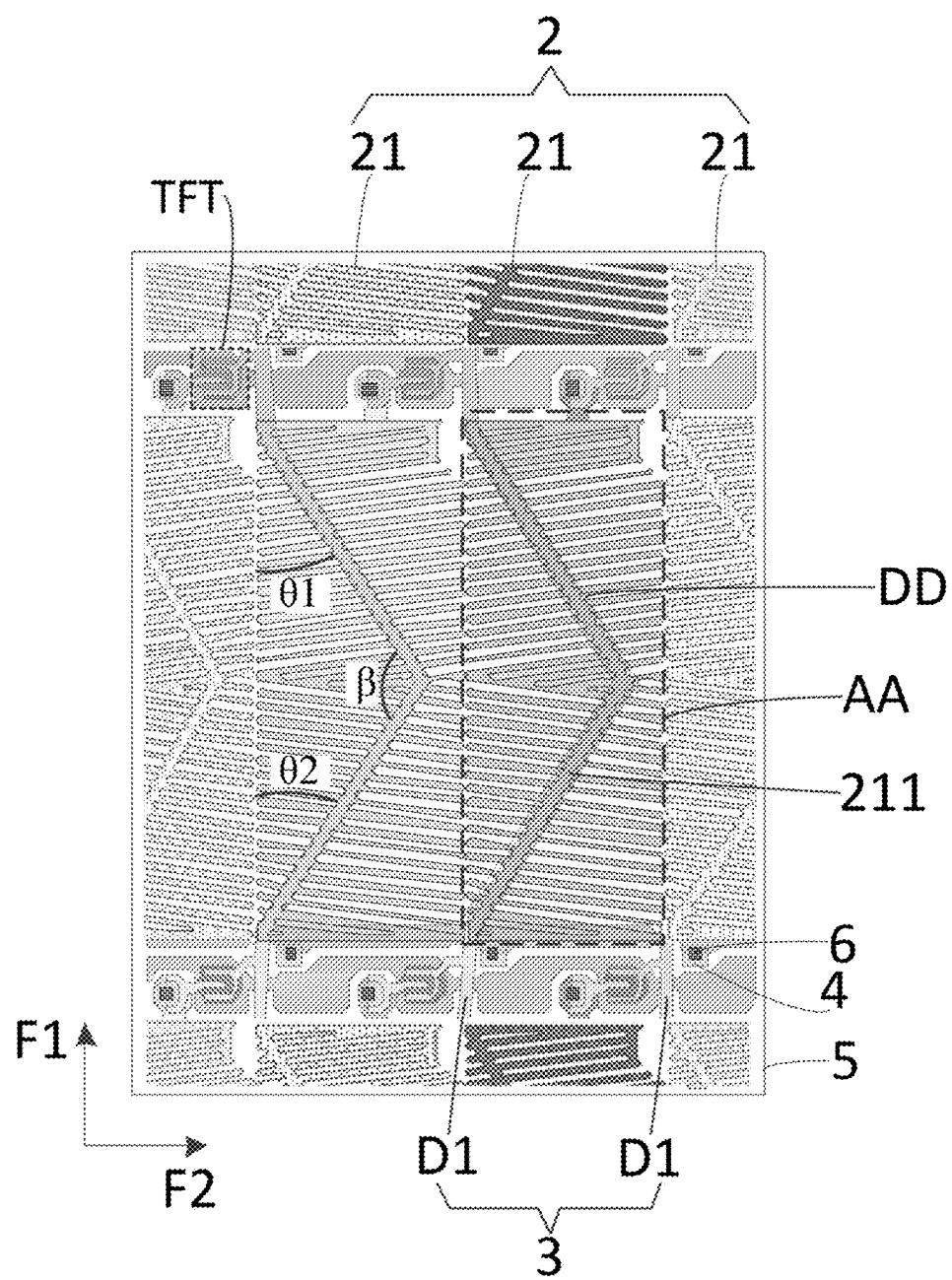
FIG. 7A is another schematic structural diagram of a display panel according to an embodiment of the present disclosure.

During specific implementation, in the above display panel provided by the embodiments of the present disclosure, as shown in FIG. 6A and FIG. 7A, FIG. 6A is a top view schematic diagram of a display panel with a double-gate structure and with an RGB color resistor fabricated on the array substrate. FIG. 7A is a top view schematic diagram of a display panel with a single gate structure and no RGB color resistor (mainly used for precise light control) on the array substrate. The display panel further includes one or more data lines 3 located between the base substrate 1 and the pixel electrode layer 2. Orthographic projections of the data lines 3 on the base substrate 1 and orthographic projections of effective light-emitting areas AA of the sub-pixels on the base substrate 1 have overlapping areas DD, and a shape of the overlapping area DD is a folded line shape. This folded line shaped data line 3 can avoid moiré caused by interference with the grating of the 3D display device, further eliminating moiré in the display screen and improving the display effect.

Figure 6B:
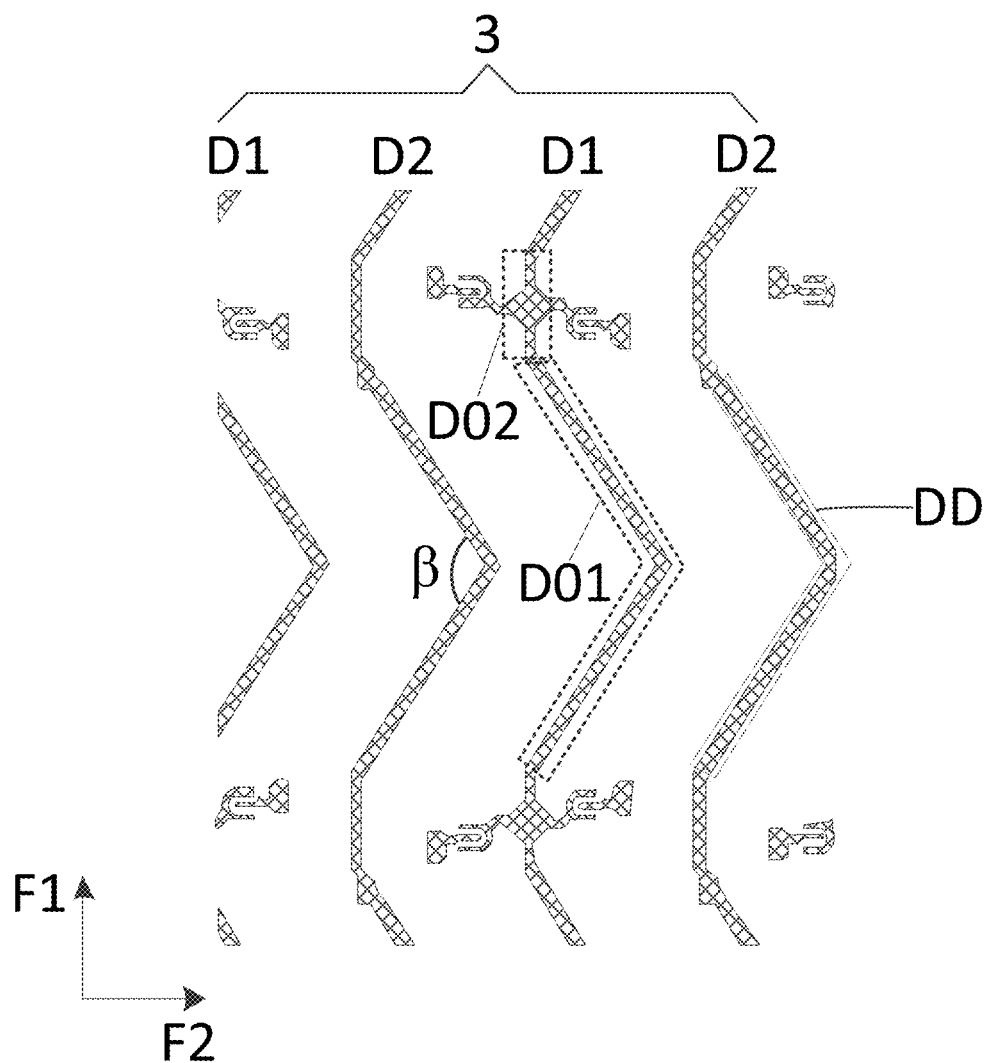
FIG. 6B is a schematic structural diagram of some layers where the data lines in FIG. 6A are located.
Figure 6C:
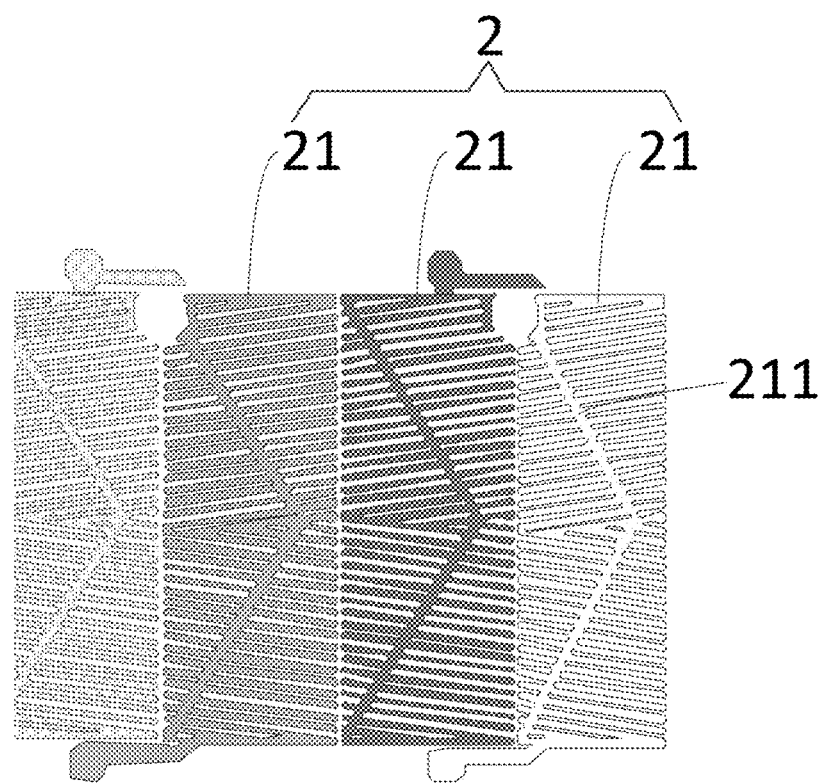
FIG. 6C is another structural schematic diagram of the pixel electrode layer in FIG. 6A.
Figure 7B:
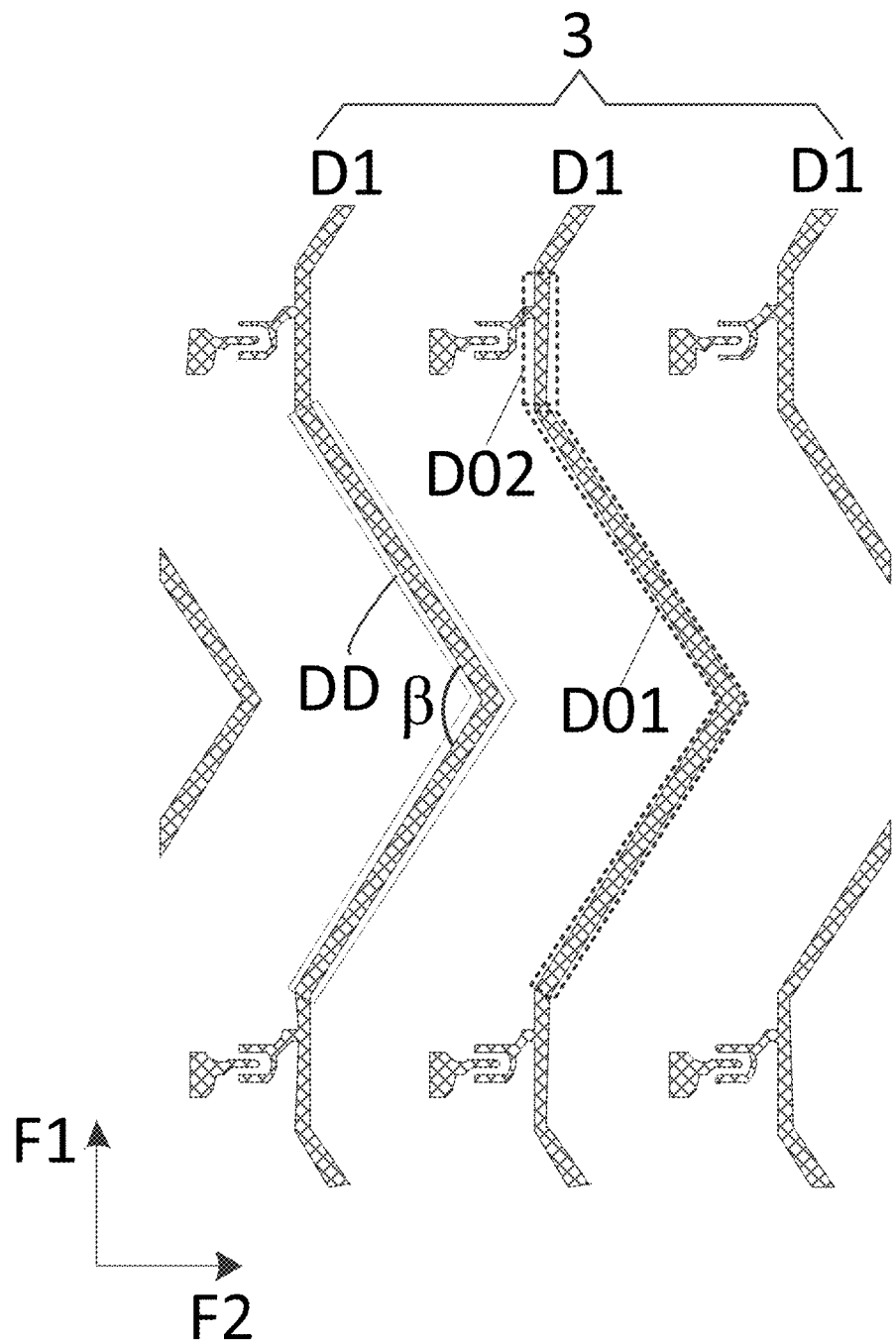
FIG. 7B is a schematic structural diagram of some layers where the data lines in FIG. 7A are located.
Figure 7C:
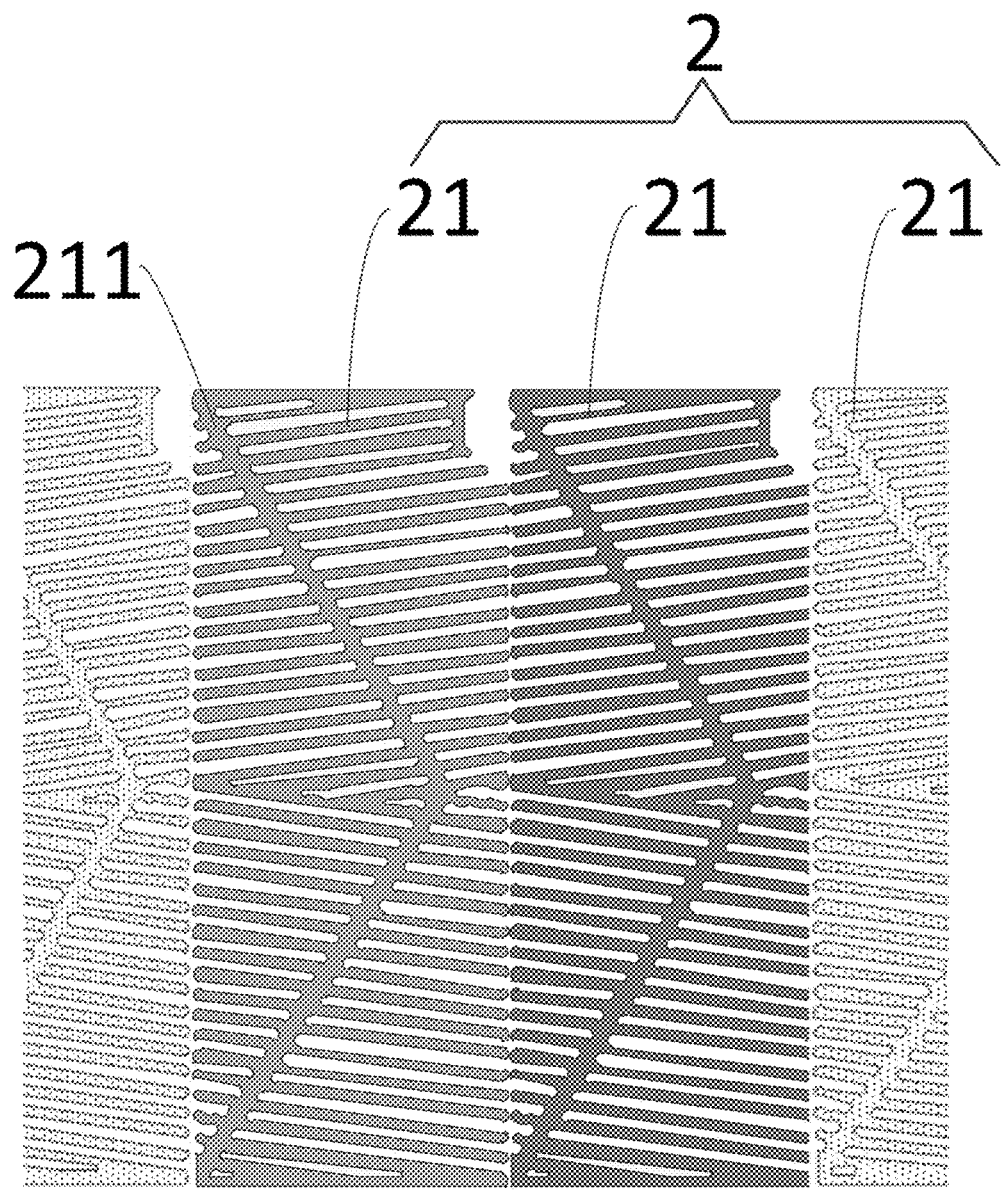
FIG. 7C is another structural schematic diagram of the pixel electrode layer in FIG. 7A.
Figure 8A:
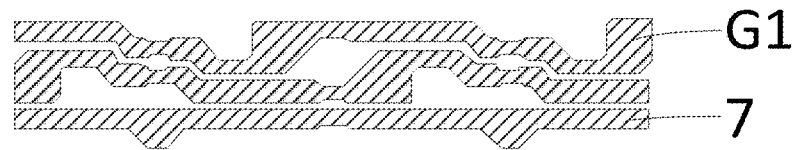
FIG. 8A-FIG. 8H are some structural schematic diagrams of superposition of respective film layers in FIG. 6A.
Figure 8A:
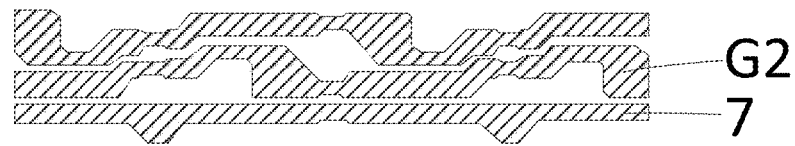
Figure 8B:
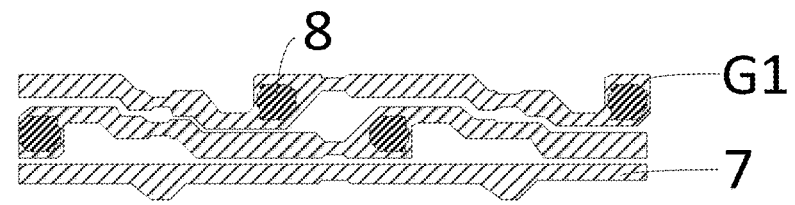
Figure 8B:
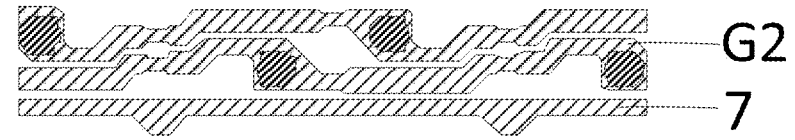
Figure 8C:
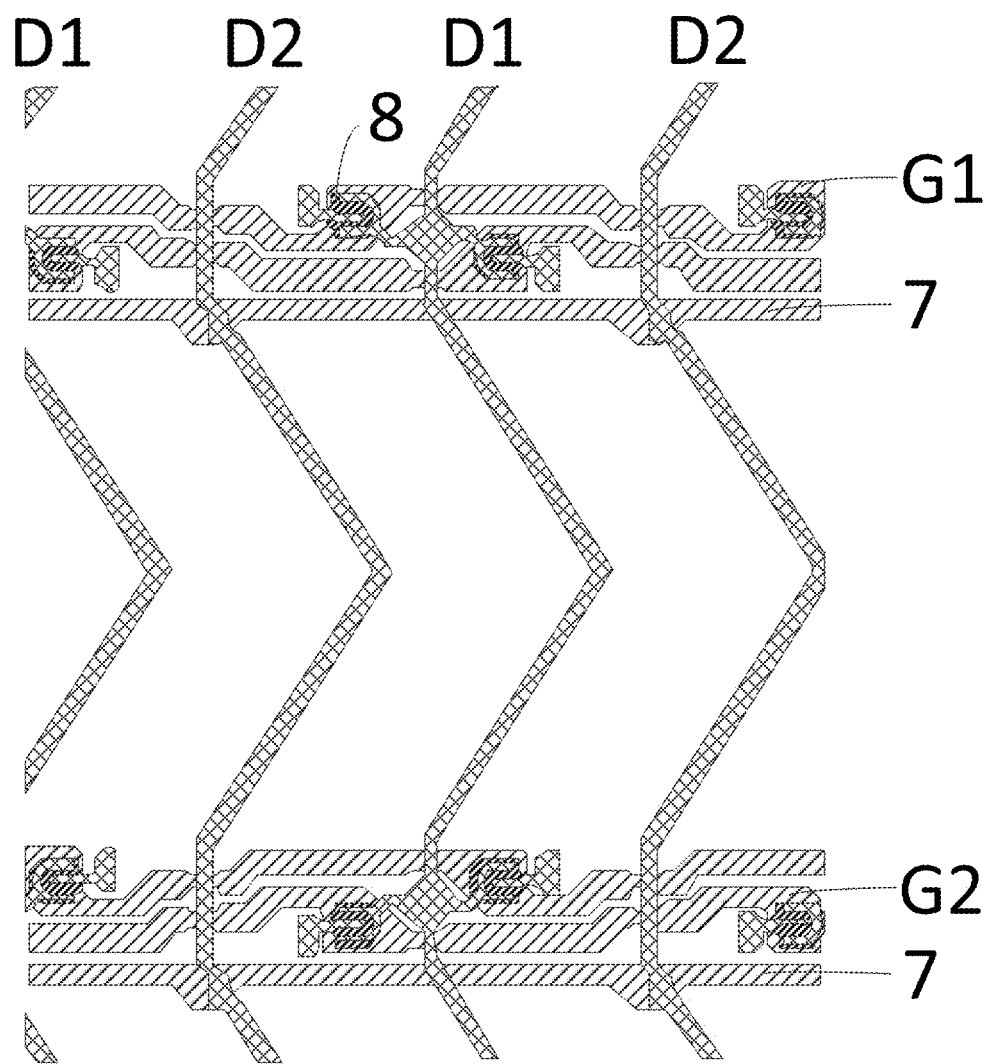
Figure 8D:
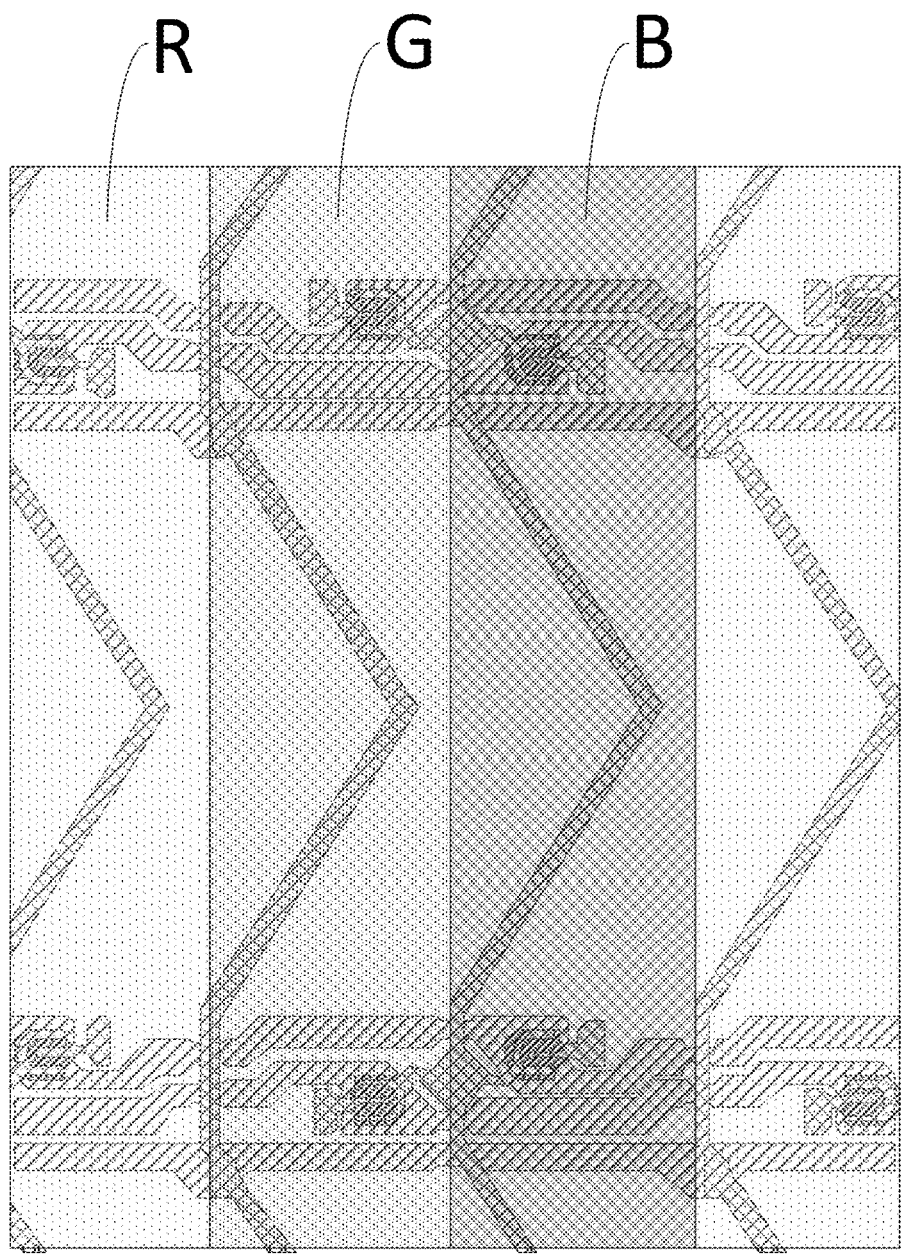
Figure 8E:
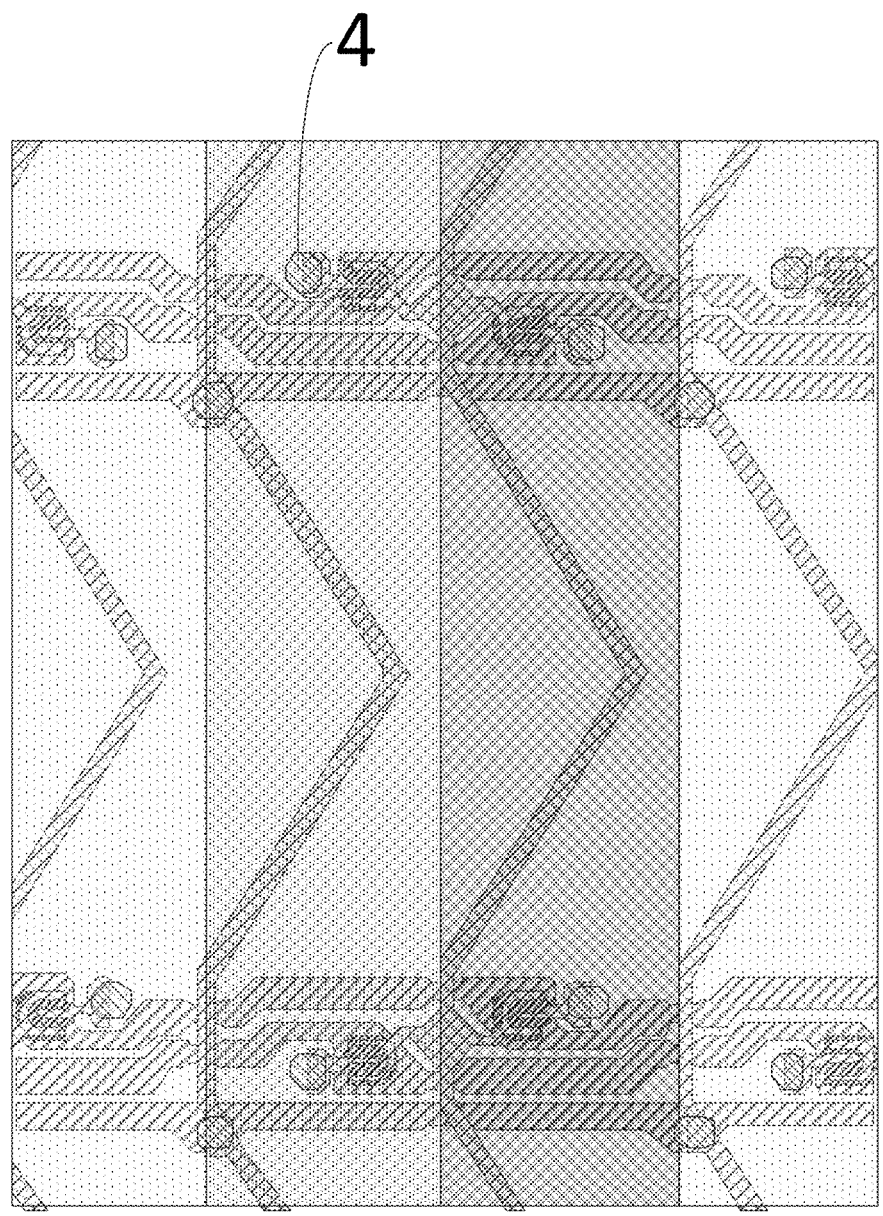
Figure 8F:
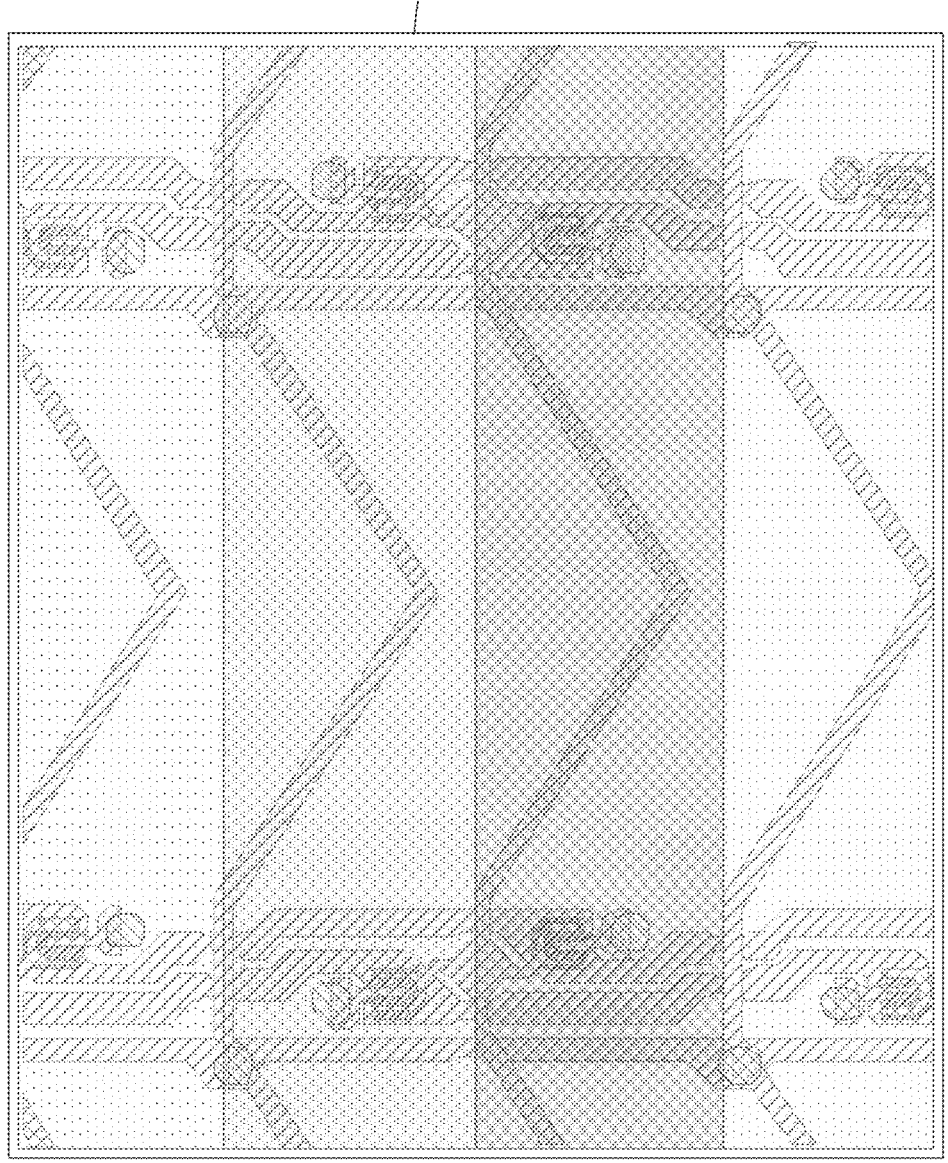
Figure 8G:
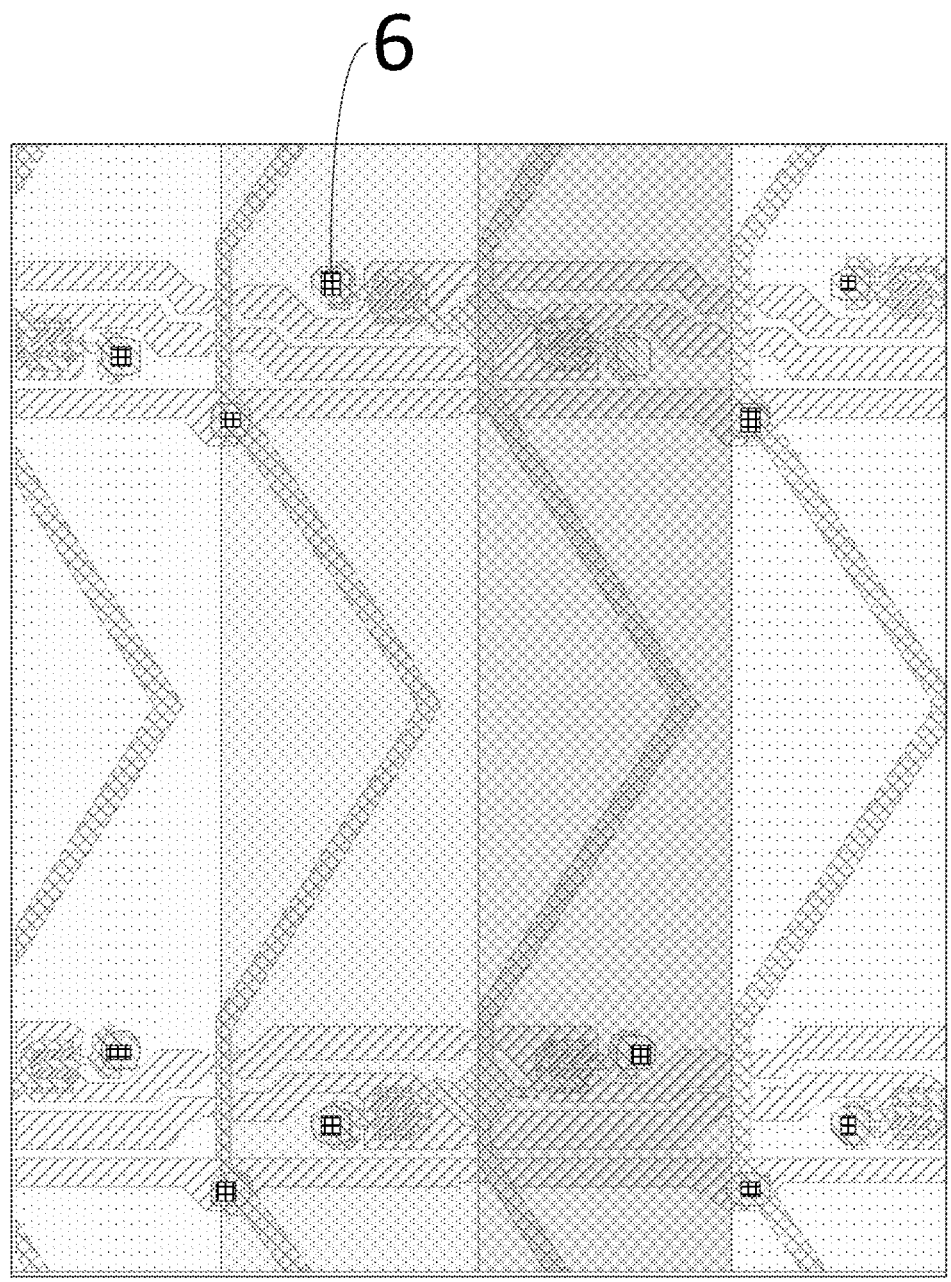
Figure 8H:
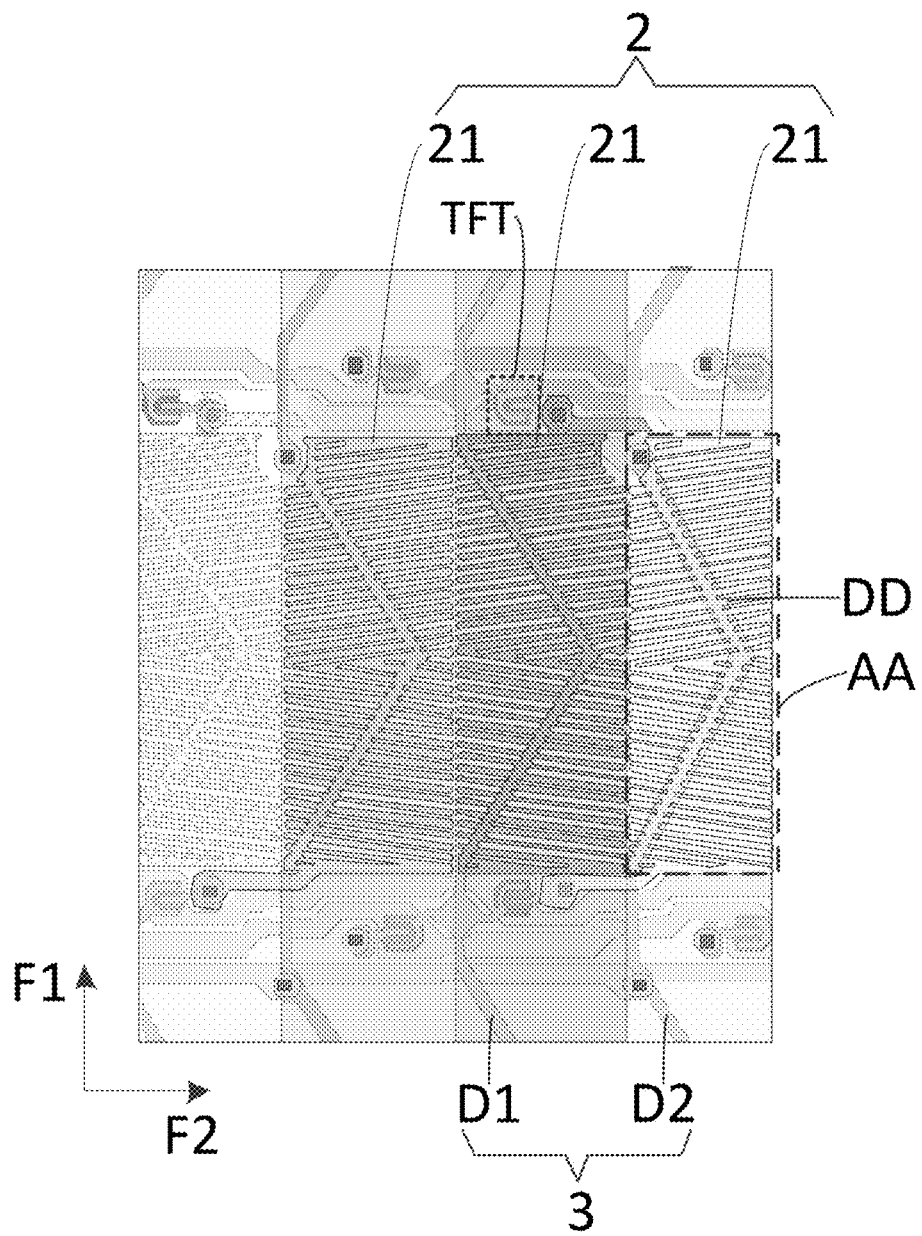
Figure 9A:
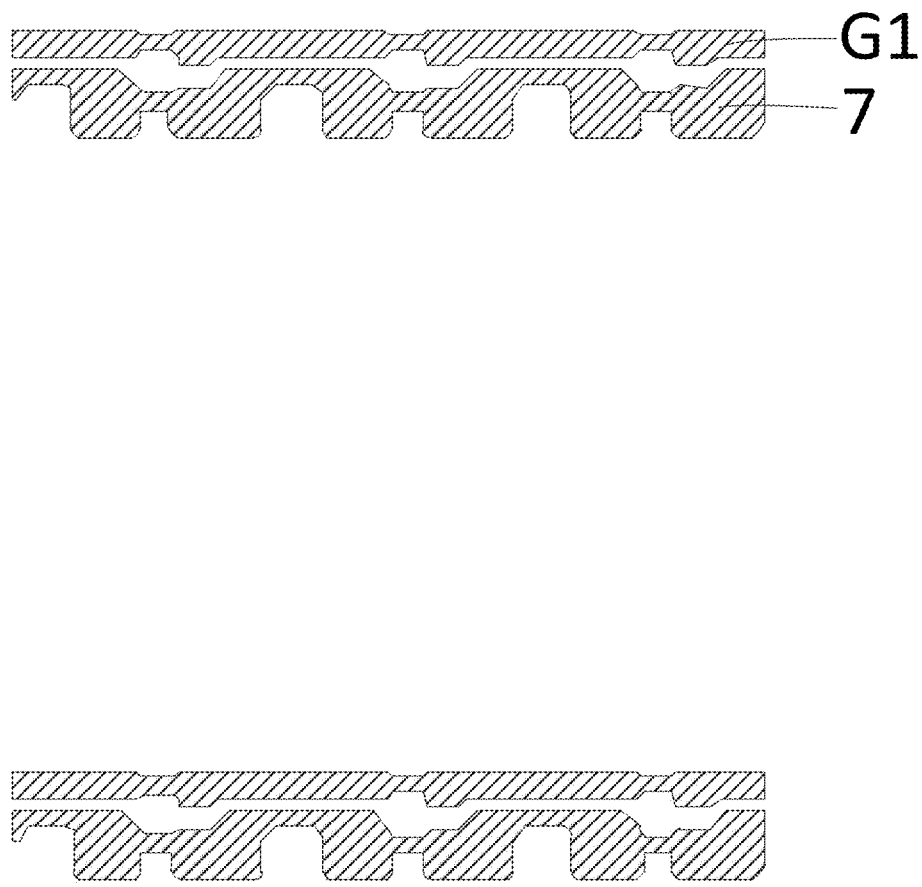
FIGS. 9A-9G are still some structural schematic diagrams of superposition of respective film layers in FIG. 7A.
Figure 9B:
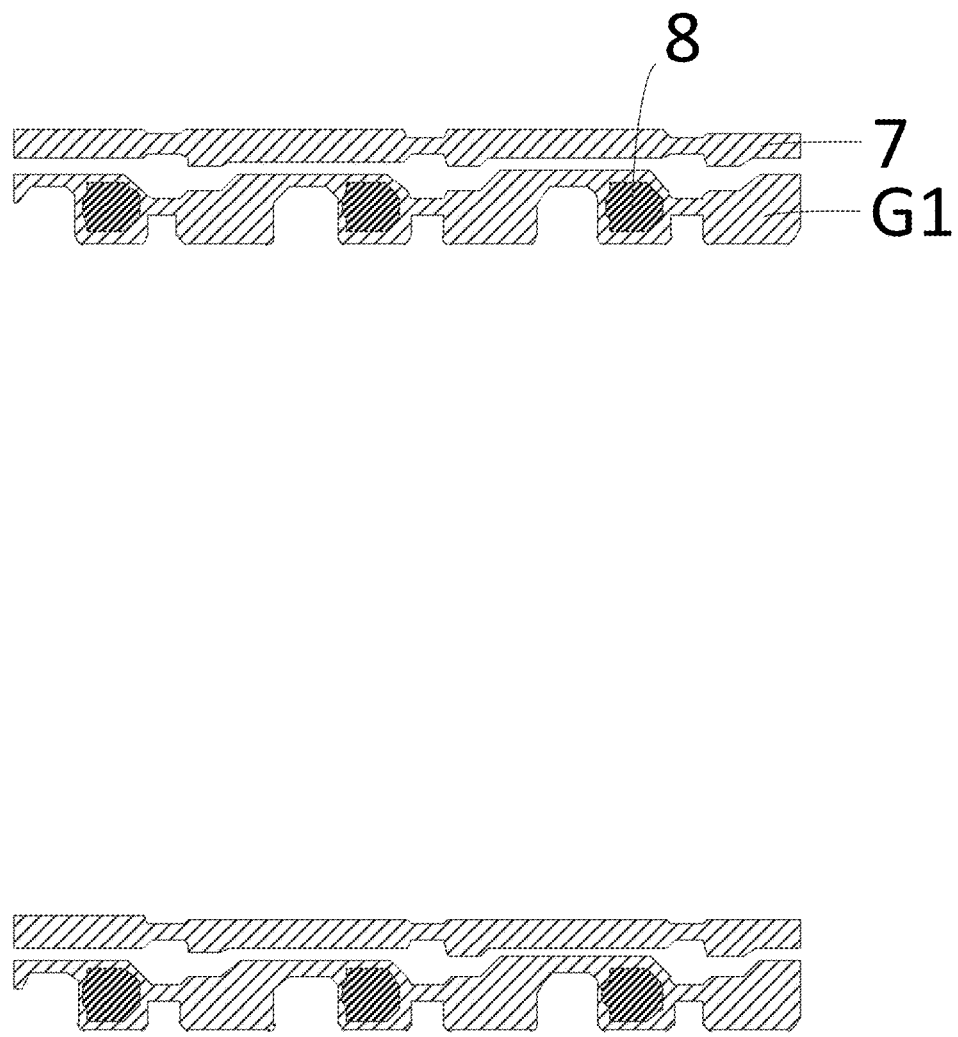
Figure 9C:
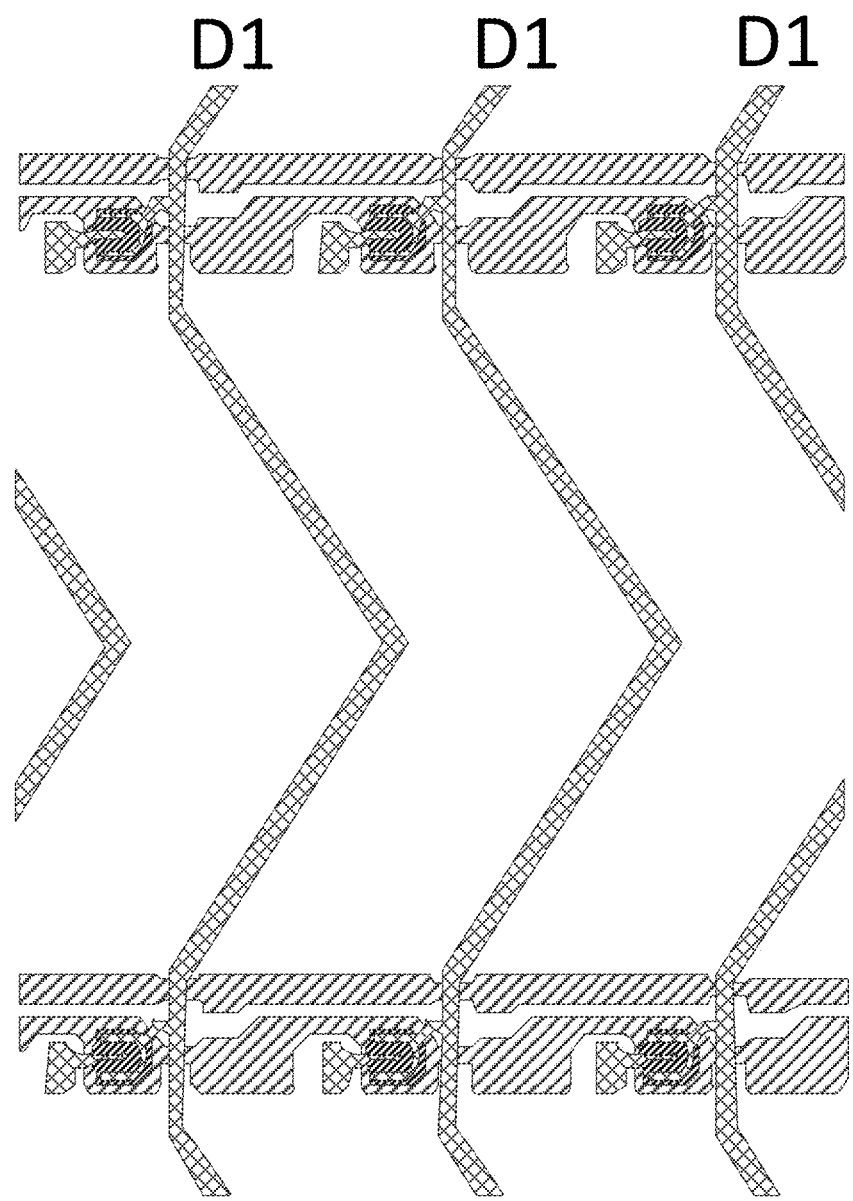
Figure 9D:
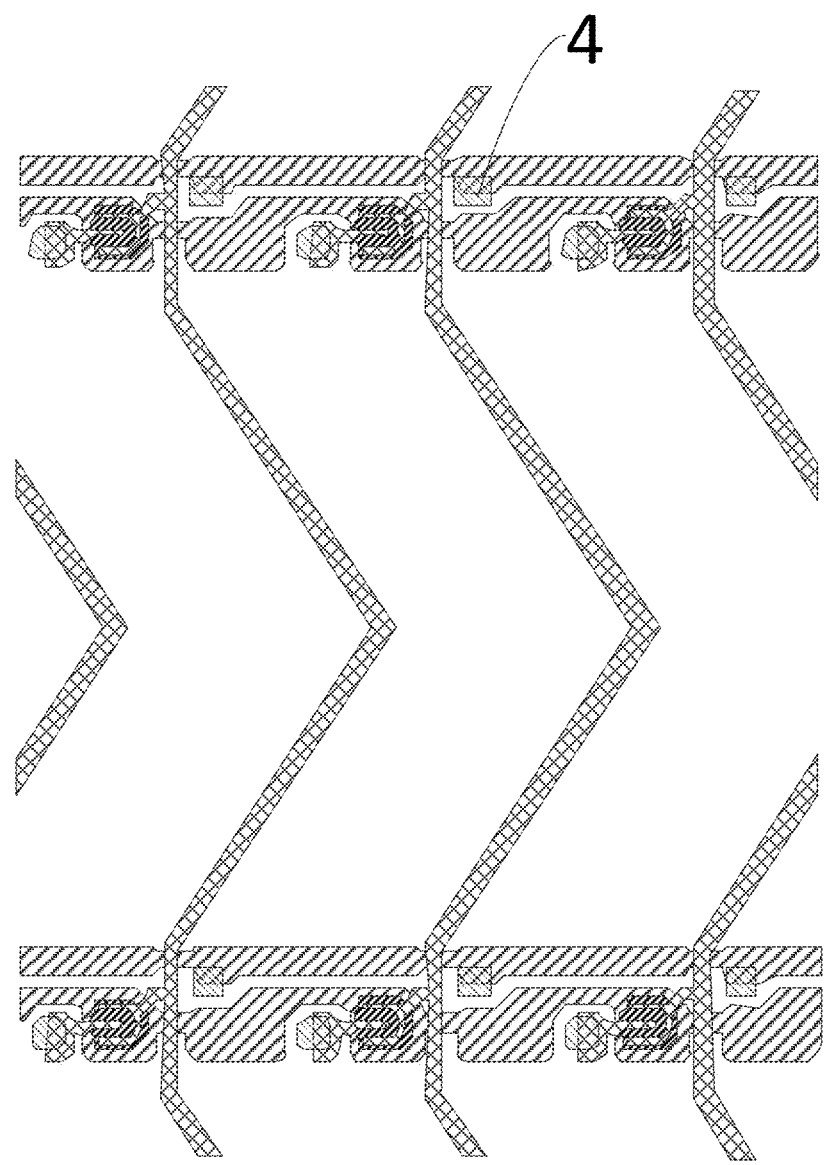
Figure 9E:
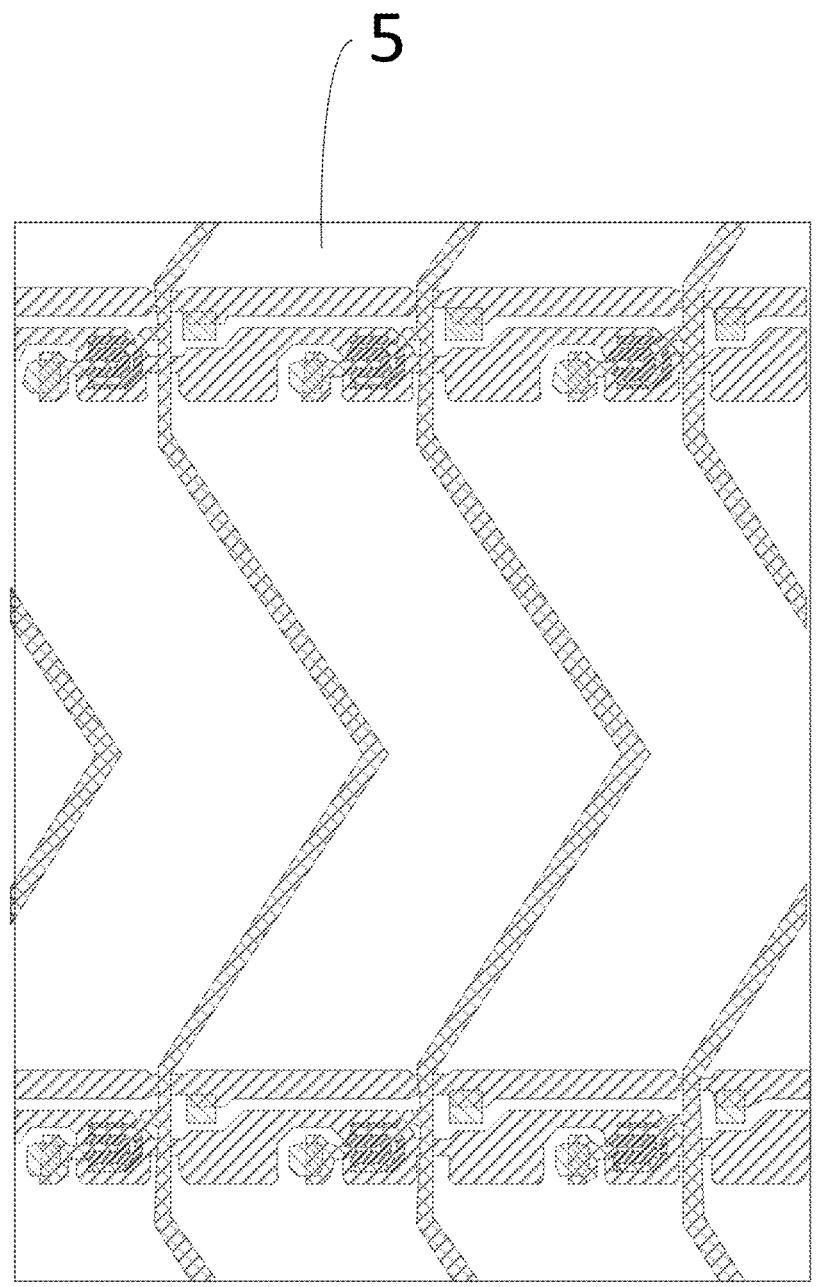
Figure 9F:
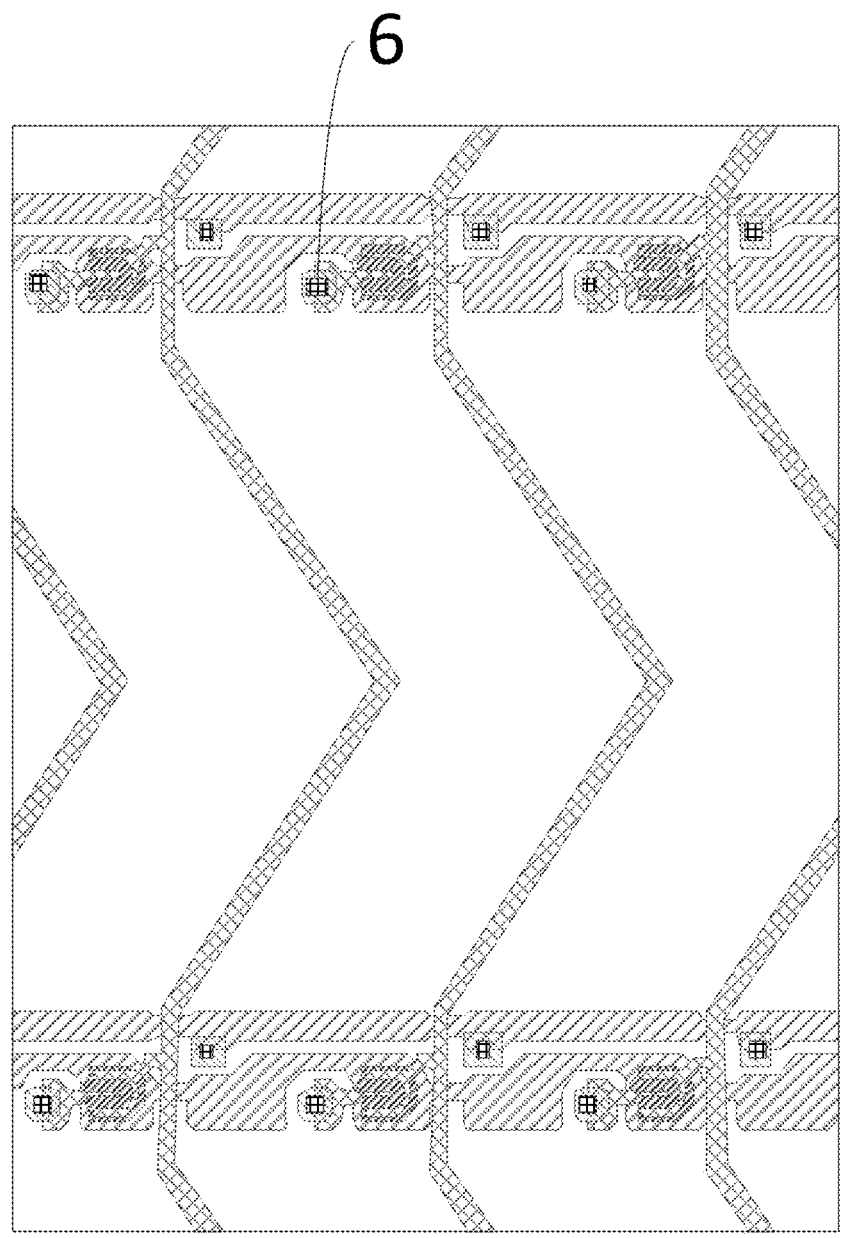
Figure 9G:
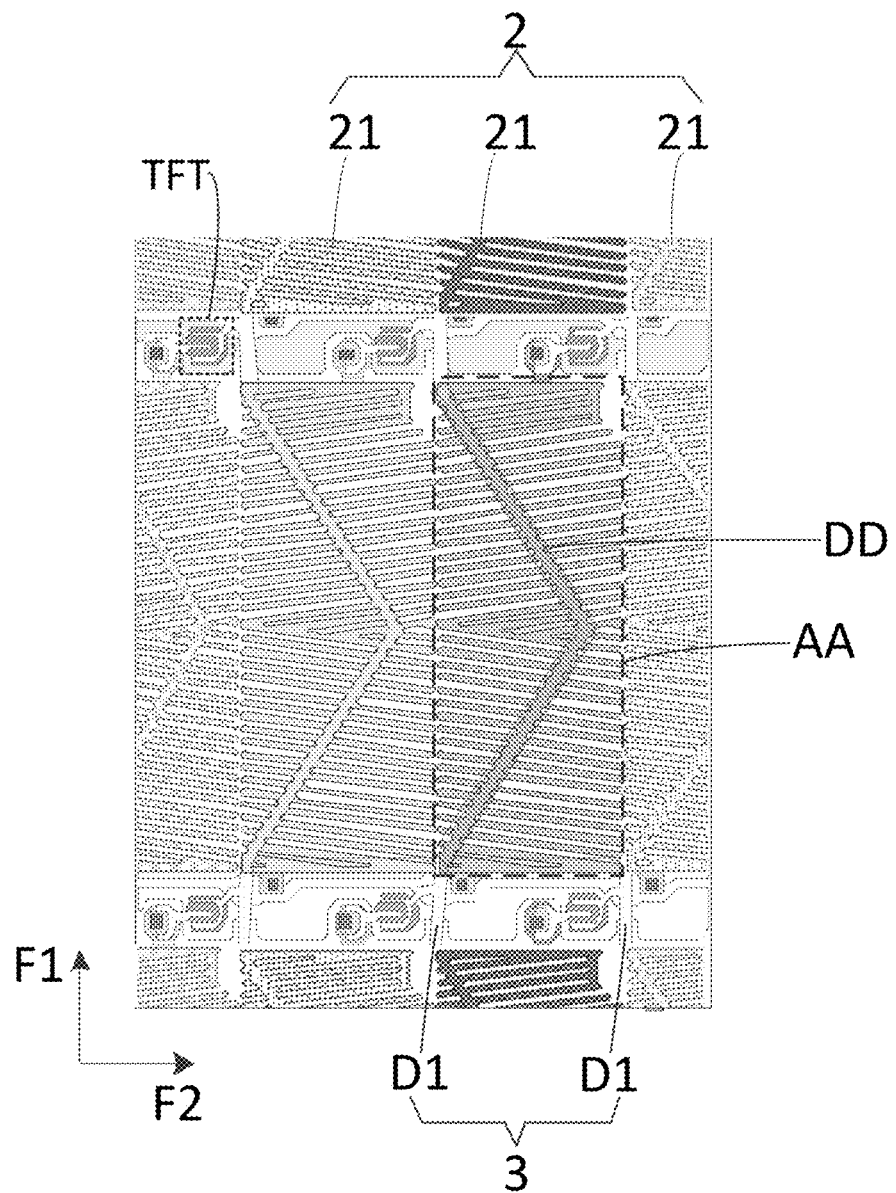

During specific implementation, in the above display panel provided by the embodiments of the present disclosure, as shown in FIG. 6B, FIG. 6C, FIG. 7B and FIG. 7C, FIG. 6B shows the structure of the data lines 3 in FIG. 6A, FIG. 6C shows the structure of the pixel electrodes 21 in FIG. 6A, FIG. 7B shows the structure of the data lines 3 in FIG. 7A, and FIG. 7C shows the structure of the pixel electrodes 21 in FIG. 7A. An orthographic projection of the first electrode strip on the base substrate 1 substantially overlaps an orthographic projection of the overlapping area DD on the base substrate. In this way, the skeleton of the pixel electrode 21 (i.e., the first electrode strip 211) is arranged along the data line 3, so that the liquid crystal disordered area overlaps with the metal light-shielding area (overlapping area DD), and the rest of the pixel electrode 21 adopts a horizontal open comb structure. Finally, the ultimate minimization of dark areas between sub-pixels is achieved.

In order to improve the severe moiré defects, the inventor of the present disclosure designed a variety of light-shielding patterns (overlapping area DD patterns) on the mask, combined with the grating of the client, to evaluate the effect of eliminating moiré, and finally verified that an optimal overlapping area DD pattern: an obtuse-angled isosceles triangle. Therefore, in a specific implementation, in the above display panel provided by the embodiments of the present disclosure, as shown in FIG. 6B and FIG. 7B, the overlapping area DD and the column direction F1 forms an isosceles triangle, and the bending angle β of the overlapping area DD is greater than 90° and less than 180°. Exemplarily, the bending angle β of the overlapping area DD may be set to 114°, and an included angle θ1 between the folded line shaped overlapping area DD and the column direction F1 of the sub-pixel P can be set to 32°, and another included angle θ2 between the folded line shaped overlapping area DD and the column direction F1 of the sub-pixel P may be set to 32°. The long side of the bending angle β is arranged along the long side of the sub-pixel (column direction F1), and the width of the light-shielding area (the long side of β) is as small as 2 μm to eliminate moiré, and the width of the other two sides is unlimited.

Of course, in practical applications, specific values of β, θ1 and θ2 may be designed according to requirements of practical applications, and are not limited herein.

During specific implementation, as shown in FIG. 6B and FIG. 7B, considering that a width of the light-shielding area of the long-side of the obtuse-angled triangle is only 2 μm, and the long side of the obtuse-angled triangle is arranged along the long side of the sub-pixel, it is currently difficult to fabricated the width of 2 μm through the black matrix (BM). Therefore, the light-shielding area of the long-side of the obtuse-angled triangle in the embodiments of the present disclosure may be made of the metal layer where the gate line is located or the metal layer where the data lines is located to achieve a light-shielding effect; the remaining two sides of the obtuse-angled triangle may be wider data lines to transmit data and achieve a light-shielding effect. It should be noted that, in the embodiments of the present disclosure, the light-shielding area of the long-side of the obtuse-angled triangle in FIG. 6B and FIG. 7B is not set, but it can also be set.

During specific implementation, in the above display panel provided by the embodiments of the present disclosure, as shown in FIG. 2, FIG. 6A, FIG. 6B, FIG. 7A and FIG. 7B, a column of sub-pixels P corresponds to one data line (D1 or D2);

each data line (D1 or D2) includes a first sub-data line D01 and a second sub-data line D02 electrically connected with each other;

an orthographic projection of the first sub-data line D01 on the base substrate 1 and an orthographic projection of an effective light-emitting area AA of a corresponding sub-pixel P on the base substrate 1 form the overlapping area DD; and an orthographic projection of the second sub-data line D02 on the base substrate 1 does not overlap with an orthographic projection of each effective light-emitting area AA on the base substrate 1. Exemplarily, the orthographic projection of the second sub-data line D02 on the base substrate 1 is located between the orthographic projections of the adjacent effective light-emitting areas AA on the base substrate 1. In this way, the data lines can be reused as a light-shielding pattern to avoid interference with the grating, which can reduce the difficulty of preparation process and reduce the thickness of the display panel.

During specific implementation, in the above display panel provided by the embodiments of the present disclosure, as shown in FIG. 6A and FIG. 7A, the display panel further includes: a first insulating layer 4 located between the data lines 3 and the pixel electrode layer 2, a common electrode layer 5 located between the first insulating layer 4 and the pixel electrode layer 2, and a second insulating layer 6 located between the common electrode layer 5 and the pixel electrode layer 2. The common electrode layer 5 has a planar structure. The common electrode layer 5 with a planar structure covers signal lines (such as data lines) in the column direction F1, which can shield the constantly changing electric field below. There is no light leakage between adjacent pixels in the column direction F1, and no vertical light-shielding layer (BM) is required to cover them. The simulated light effect results show that the width of the display dark area in the column direction F1 between sub-pixels can be as small as 3.5 μm.

Specifically, an electric field is formed through the pixel electrodes 21 and the common electrode layer 5 to drive liquid crystal molecules of the liquid crystal display to deflect.

The display panel with a double gate structure shown in FIG. 6A can minimize the display dark area between the sub-pixels, so the RGB color resistor may be fabricated on the array substrate, which can more effectively avoid the risk of color crosstalk due to the box-forming (array substrate+ color filter substrate). Considering that a basic aperture ratio of a product with the double gate structure is lower than that of the single gate, the solutions of the embodiments of the present disclosure are more meaningful for improving the product with the double gate structure.

During specific implementation, in the above display panel provided by the embodiments of the present disclosure, as shown in FIG. 2 and FIG. 6A, the plurality of data lines 3 include a plurality of first-type data lines D1 and a plurality of second-type data lines D2; the first-type data lines D1 and the second-type data lines D2 are alternately arranged along a row direction F2 of the sub-pixels P. Here, the first-type data lines D1 are electrically connected with the thin film transistors TFT of the sub-pixels P, and the second-type data lines D2 are not electrically connected with the thin film transistors TFT of the sub-pixels P. Exemplarily, the sub-pixels P in odd columns may be provided corresponding to the first-type data lines D1, and the sub-pixels P in even-numbered columns may be provided corresponding to the second-type data lines D2. Alternatively, the sub-pixels P in odd columns may be provided corresponding to the second-type data lines D2, and the sub-pixels P in even-numbered columns may be provided corresponding to the first-type data lines D1.

During specific implementation, in the above display panel provided by the embodiments of the present disclosure, as shown in FIG. 2 and FIG. 6A, two adjacent columns of sub-pixels P are taken as a column group, and every two adjacent column groups correspond to one first-type data line D1; and in every two adjacent column groups, an odd numbered row of sub-pixels P in a first column group are electrically connected with the corresponding first-type data line D1, and an even numbered row of sub-pixels P in a second column group are electrically connected with the corresponding first-type data line D1.

Exemplarily, the first column of sub-pixels P and the second column of sub-pixels P are taken as the column group B1, the third column of sub-pixels P and the fourth column of sub-pixels P are taken as the column group B2, the fifth column of sub-pixels P and the sixth column of sub-pixels P are taken as the column group B3. The column group B1 corresponds to the first second-type data line D2, the column group B2 corresponds to the second second-type data line D2, the column group B3 corresponds to the third second-type data line D2, adjacent column group B1 and column group B2 corresponds to the first first-type data line D1, and adjacent column group B2 and column group B3 correspond to the second first-type data line D1. In the adjacent column group B1 and column group B2, the column group B1 is used as a first column group, the column group B2 is used as a second column group, and the odd-numbered rows of sub-pixels P in the column group B1 are all electrically connected with the corresponding first-type data lines D1, and the even-numbered rows of sub-pixels P in the column group B2 are all electrically connected with the corresponding first-type data lines D1. In the adjacent column group B2 and column group B3, the column group B2 is used as the first column group, the column group B3 is used as the second column group, and the odd-numbered rows of sub-pixels P in the column group B2 are all electrically connected with the corresponding first-type data line D1, and the even-numbered rows of sub-pixels P in the column group B3 are all electrically connected with the corresponding first-type data lines D1. The same applies to the rest, and so on, without further elaboration here.

During specific implementation, in the above display panel provided by the embodiments of the present disclosure, as shown in FIG. 8A to FIG. 8H, FIG. 8A to FIG. 8H are schematic diagrams of superimposed layout of each film layer in FIG. 6A, and the display panel further includes: a plurality of gate lines (G1, G2) located between the data lines 3 and the base substrate 1 and insulated and intersected with the data lines 3, a third insulating layer (not shown) located between the data lines 3 and the gate lines (G1, G2), and common electrode connection lines 7 arranged at intervals on the same layer as the gate lines (G1, G2); here, the gate lines (G1, G2) extend along the row direction F2 of the sub-pixels, and one row of the sub-pixels corresponds to two gate lines (G1, G2); the common electrode connection lines 7 extend along the row direction F2 of the sub-pixels P, and orthographic projections of the common electrode connection lines 7 on the base substrate 1 do not overlap with orthographic projections of the effective light-emitting areas AA on the base substrate 1.

The common electrode connection lines 7 are electrically connected with the second-type data lines D2 through via holes penetrating the third insulating layer, so that the common electrode connection lines 7 arranged at intervals can be electrically connected through the second-type data lines D2. The same voltage is transmitted on the second-type data lines D2 and the common electrode connection lines 7, which can avoid signal interference between the second-type data lines D2 and the common electrode layer 5; the second-type data lines D2 is electrically connected with the common electrode layer 5 through the via holes penetrating the first insulating layer 4, so that the common electrode connection lines 7, the second-type data lines D2 and the common electrode layer 5 may be electrically connected to form a parallel connection, so that the effect of reducing resistance can also be achieved.

Exemplarily, as shown in FIG. 8A to FIG. 8H, the orthographic projections of the gate lines (G1, G2) on the base substrate 1 are located between orthographic projections of the effective light-emitting areas AA of two adjacent rows of sub-pixels P on the base substrate 1. In addition, two gate lines (G1, G2) corresponding to the sub-pixels P in the same row are respectively located at both sides of the sub-pixels P in the corresponding row. For example, one of the two gate lines (G1, G2) corresponding to the same row of sub-pixels P (such as GA1) is electrically connected with thin film transistors in an odd-numbered column of sub-pixels P in the row, and the other gate line (such as GA2) is electrically connected with thin film transistors in an even-numbered column of the sub-pixels P in the row. The gate line (such as GA1) electrically connected with the thin film transistors in the odd-numbered column of sub-pixels P in the row may be arranged above the row, and the gate line (such as GA2) electrically connected with the thin-film transistors in the even-numbered column of sub-pixels P in the row can be set below the row.

Exemplarily, one row of sub-pixels P corresponds to one common electrode connection line 7, and the common electrode connection line 7 is located between the corresponding row of sub-pixels P and the gate line disposed above the row of sub-pixels P.

Exemplarily, an orthographic projection of the via hole penetrating the third insulating layer on the base substrate 1 may be located within an orthographic projection of the via hole penetrating the first insulating layer 4 on the base substrate 1. Alternatively, the orthographic projection of the via hole penetrating the first insulating layer 4 on the base substrate 1 may be located within the orthographic projection of the via hole penetrating the third insulating layer on the base substrate 1. Alternatively, the orthographic projection of the via hole penetrating through the third insulating layer on the base substrate 1 may only partially overlap with the orthographic projection of the via hole penetrating the first insulating layer 4 on the base substrate 1. Alternatively, the orthographic projection of the via hole penetrating the third insulating layer on the base substrate 1 may not overlap with the orthographic projection of the via hole penetrating the first insulating layer 4 on the base substrate 1.

During specific implementation, in the above display panel provided by the embodiments of the present disclosure, as shown in FIG. 8A to FIG. 8H, the display panel further includes a color resistor layer located between the data lines 3 and the first insulating layer 4. The color resistor includes a plurality of color resistors (R, G, B) corresponding to the sub-pixels.

The function of the array substrate in the display panel with a single gate structure shown in FIG. 7A is mainly to precisely control light without color resistor. On the one hand, the pixel should have the highest possible aperture ratio and transmittance; on the other hand, considering moiré, it is usually necessary to bend the data line at a specific angle. Based on this, the sub-pixel with a single gate structure has a larger aperture ratio, and the data line is bent at a specific angle to reduce moiré. Further adopting the design structure of the present disclosure, the skeleton of the pixel electrode 21 (the first electrode strip 211) is arranged along the data line, so that the liquid crystal disordered area overlaps with the metal light-shielding area; the rest of the pixel electrode 21 adopts a horizontal open comb structure, to finally achieve the ultimate minimization of dark areas between pixels.

During specific implementation, in the above display panel provided by the embodiments of the present disclosure, as shown in FIG. 7A, the sub-pixels P in the same column are electrically connected with the same data line D1, and the sub-pixels P in different columns are electrically connected with different data lines D1.

During specific implementation, in the above display panel provided by the embodiments of the present disclosure, as shown in FIG. 9A to FIG. 9G, FIG. 9A to FIG. 9G are schematic diagrams of superimposed layout of each film layer in FIG. 7A, and the display panel further includes: a plurality of gate lines G1 located between the data lines 3 and the base substrate 1 and insulated and intersected with the data lines 3, a third insulating layer (not shown) located between the data lines 3 and the gate lines G1, and common electrode connection lines 7 arranged at intervals on the same layer as the gate lines G1; where the gate lines G1 extend along the row direction F2 of the sub-pixels, and one row of sub-pixels corresponds to one gate line G1; the common electrode connection lines 7 extend along the row direction F2 of the sub-pixels P, and the orthographic projections of the common electrode connection lines 7 on the base substrate 1 do not overlap with the orthographic projections of the effective light-emitting areas AA on the base substrate 1.

The common electrode layer 5 is electrically connected with each common electrode connection line 7 through via holes that sequentially penetrate through the first insulating layer 4 and the third insulating layer.

During specific implementation, in the above display panel provided by the embodiments of the present disclosure, as shown in FIG. 9A to FIG. 9G. The display panel further includes an opposite substrate (not shown) disposed opposite to the base substrate, a liquid crystal layer (not shown) packaged between the base substrate 1 and the opposite substrate; a color resistor layer (not shown) is provided on the opposite substrate, and the color resistor layer includes a plurality of color resistors corresponding to the sub-pixels P. The color of the color resistor is consistent with the light emitting color of the corresponding sub-pixel P. In addition, the sub-pixel P may further include a thin film transistor TFT electrically connected with the pixel electrode 21. A gate scanning signal is input to the TFT through the gate line G1 to control the TFT to be turned on, so that the data signal transmitted on the data line 3 is input into the pixel electrode 21, the pixel electrode is input with a voltage, and the common electrode layer 5 is input with a common voltage, to drive liquid crystal molecules to rotate to display images.

During specific implementation, as shown in FIGS. 8A to 8H and FIGS. 9A to 9G, the pixel electrode 21 and the common electrode layer 5 are generally made of transparent conductive material ITO. Since the pixel electrode 21 provided by the embodiments of the present disclosure is designed as the top layer ITO, away from the film layer where the data line is located and the film layer where the gate line is located, so as to reduce signal crosstalk.

During specific implementation, as shown in FIG. 8A to FIG. 8H and FIG. 9A to FIG. 9G, a gate insulating layer may be provided between the layer where the gate lines (G1 and G2) are located and the base substrate 1, and an active layer 8 of a thin film transistor may be provided between the gate insulating layer and the base substrates 1.

During specific implementation, as shown in FIGS. 8A to 8H and FIGS. 9A to 9G, in the embodiments of the present disclosure, the overlapping area between the pixel electrode 21 and the common electrode layer 5 increases due to the bending of the data line 3. The material of the first insulating layer 4 between the data line 3 and the pixel electrode layer 2 may be an organic material, and the coupling capacitance can be reduced by using the organic film process, so as to ensure the charging rate of the pixel and the picture quality.

The inventor of the present disclosure conducted a light effect simulation on the pixel electrode structure provided in the embodiments of the present disclosure, and the simulation results show that the minimum width of the display dark area in the vertical direction between sub-pixels can reach 3.5 μm. The average width of the display dark area between sub pixels is only 7 μm. The level of moiré defects has significantly decreased, which accumulates a technical foundation for subsequent product development.

Based on the same inventive concept, the embodiments of the present disclosure further provide a display device, including the above display panel provided by the embodiments of the present disclosure. The problem-solving principle of the display device is similar to that of the aforementioned display panel, so the implementation of the display device can refer to the aforementioned implementation of the display panel, and repeated descriptions will not be repeated herein.

During specific implementation, in the embodiments of the present disclosure, the display device may further include: a grating located at the light-emitting side of the display panel. Here, the grating is used to enable the display device to achieve a 3D display effect, so that the display device in the embodiments of the present disclosure can achieve a 3D display effect.

In the display panel and the display device provided by the embodiments of the present disclosure, the pixel electrodes are arranged to include a first electrode strip and comb structures respectively connected to both sides of the first electrode strip, and the comb structures are composed of a plurality of second electrode strips and a plurality of slits are alternately arranged, so that there is no electrode skeleton on the edge of the pixel electrode structure provided by the present disclosure, but the electrode skeleton (the first electrode strip) is moved to the inside of the sub-pixel, that is, the edge of the pixel electrode structure is an open comb structure, so that the liquid crystals on the edge of the pixel electrode can be arranged in an orderly manner, so that the display dark area between the sub-pixels can be reduced, and when the display panel provided by the embodiments of the present disclosure is applied to a 3D display device, moiré can be reduced and the display effect can be improved.

Obviously, those skilled in the art can make various changes and modifications to the present disclosure without departing from the spirit and scope of the present disclosure. Thus, if these modifications and variations of the present disclosure fall within the scope of the claims of the present disclosure and equivalent technologies thereof, the present disclosure also intends to include these modifications and variations.

What is claimed is:

1. A display panel, comprising:
    a base substrate, having multiple rows and multiple columns of sub-pixels;
    a pixel electrode layer, located on the base substrate, wherein the pixel electrode layer comprises a plurality of pixel electrodes arranged at intervals, and one sub-pixel comprises one pixel electrode;
    data lines between the base substrate and the pixel electrode layer, wherein the data lines comprise a plurality of first-type data lines and a plurality of second-type data lines; the first-type data lines and the second-type data lines are alternately arranged along a row direction;
    a first insulating layer between the data lines and the pixel electrode layer;
    a common electrode layer between the first insulating layer and the pixel electrode layer;
    a plurality of gate lines located between the data lines and the base substrate and insulated and intersected with the data lines;
    a second insulating layer between the data lines and the gate lines; and
    common electrode connection lines arranged at intervals on a same layer as the gate lines; wherein,
    each pixel electrode comprises a first electrode strip, and comb structures respectively connected to both sides of the first electrode strip;
    the comb structures are composed of a plurality of second electrode strips and a plurality of slits arranged alternately;
    the gate lines extend along the row direction, and one row of the sub-pixels corresponds to two gate lines; the common electrode connection lines extend along the row direction; and
    the common electrode connection lines are electrically connected with each of the second-type data lines through via holes penetrating the second insulating layer, and the second-type data lines are connected with the common electrode layer through via holes penetrating the first insulating layer.

2. The display panel according to claim 1, wherein a shape of the first electrode strip is a folded line shape.

3. The display panel according to claim 2, wherein the first electrode strip is divided into a first sub-electrode strip and a second sub-electrode strip along a bending point; and
    the second electrode strips on both sides of the first sub-electrode strip are in one-to-one correspondence and are located on a same straight line, and the second electrode strips on both sides of the second sub-electrode strip are in one-to-one correspondence and are located on a same straight line.

4. The display panel according to claim 3, wherein the second electrode strips connected with the first sub-electrode strip are approximately parallel, and the second electrode strips connected with the second sub-electrode strip are approximately parallel.

5. The display panel according to claim 4, wherein the second electrode strips connected with the first sub-electrode strip have a first inclination angle to a row direction, the second electrode strips connected with the second sub-electrode strip have a second inclination angle to the row direction, and the first inclination angle and the second inclination angle are supplementary angles.

6. The display panel according to claim 3, wherein each pixel electrode has a center line extending along a row direction, and the bending point is substantially located on the center line.

7. The display panel according to claim 6, wherein the first electrode strip has a bending angle at a position corresponding to the bending point, and on a side of the bending angle and at a position close to the bending point, the plurality of second electrode strips correspondingly connected with the first sub-electrode strip and the plurality of second electrode strips correspondingly connected with the second sub-electrode strip are electrically connected;
on opposite sides of the bending angle and at two side edges away from the bending point, the plurality of second electrode strips correspondingly connected with the first sub-electrode strip are electrically connected, and the plurality of second electrode strips correspondingly connected with the second sub-electrode strip are electrically connected; and
ends, far away from the first electrode strip, of the second electrode strips at other positions are independent from each other.

8. The display panel according to claim 1, wherein orthographic projections of the data lines on the base substrate and orthographic projections of effective light-emitting areas of the sub-pixels on the base substrate have an overlapping area, and a shape of the overlapping area is a folded line shape.

9. The display panel according to claim 8, wherein an orthographic projection of the first electrode strip on the base substrate substantially overlaps the overlapping area.

10. The display panel according to claim 9, wherein the overlapping area forms an isosceles triangle with a column direction;
wherein a bending angle of the overlapping area is larger than 90° and smaller than 180°.

11. The display panel according to claim 8, wherein one column of the sub-pixels corresponds to one data line;
each data line comprises a first sub-data line and a second sub-data line electrically connected with each other;
an orthographic projection of the first sub-data line on the base substrate and an orthographic projection of an effective light-emitting area of a corresponding sub-pixel on the base substrate form the overlapping area; and
an orthographic projection of the second sub-data line on the base substrate does not overlap with an orthographic projection of each effective light-emitting area on the base substrate.

12. The display panel according to claim 1, further comprising:
a third insulating layer between the common electrode layer and the pixel electrode layer; wherein
the common electrode layer has a planar structure.

13. The display panel according to claim 8, wherein, orthographic projections of the common electrode connection lines on the base substrate do not overlap with the orthographic projections of the effective light-emitting areas on the base substrate.

14. The display panel according to claim 1, further comprising:
a color resistor layer located between the data lines and the first insulating layer, wherein
the color resistor layer comprises a plurality of color resistors arranged corresponding to the sub-pixels.

15. The display panel according to claim 1, further comprising: an opposite substrate disposed opposite to the base substrate, and a liquid crystal packaged between the base substrate and the opposite substrate; a color resistor layer is provided on the opposite substrate, and the color resistor layer comprises a plurality of color resistors corresponding to the sub-pixels.

16. A display device, comprising a display panel, wherein the display panel comprises:
a base substrate, having multiple rows and multiple columns of sub-pixels;
a pixel electrode layer, located on the base substrate, wherein the pixel electrode layer comprises a plurality of pixel electrodes arranged at intervals, and one sub-pixel comprises one pixel electrode;
data lines between the base substrate and the pixel electrode layer, wherein the data lines comprise a plurality of first-type data lines and a plurality of second-type data lines; the first-type data lines and the second-type data lines are alternately arranged along a row direction;
a first insulating layer between the data lines and the pixel electrode layer;
a common electrode layer between the first insulating layer and the pixel electrode layer;
a plurality of gate lines located between the data lines and the base substrate and insulated and intersected with the data lines;
a second insulating layer between the data lines and the gate lines; and
common electrode connection lines arranged at intervals on a same layer as the gate lines; wherein,
each pixel electrode comprises a first electrode strip, and comb structures respectively connected to both sides of the first electrode strip; and
the comb structures are composed of a plurality of second electrode strips and a plurality of slits arranged alternately;
the gate lines extend along the row direction, and one row of the sub-pixels corresponds to two gate lines; the common electrode connection lines extend along the row direction; and
the common electrode connection lines are electrically connected with each of the second-type data lines through via holes penetrating the second insulating layer, and the second-type data lines are connected with the common electrode layer through via holes penetrating the first insulating layer.

17. The display device according to claim 16, further comprising: a grating located at a light emitting side of the display panel.

18. The display panel according to claim 1, wherein two adjacent columns of sub-pixels are taken as a column group, and every two adjacent column groups correspond to one first-type data line; wherein in every two adjacent column groups, an odd numbered row of sub-pixels of a first column group are electrically connected with the corresponding first-type data line, and an even numbered row of sub-pixels of a second column group are electrically connected with the corresponding first-type data line.

19. The display panel according to claim 1, wherein sub-pixels located in a same column are electrically connected with a same data line, and sub-pixels located in different columns are electrically connected with different data lines.

* * * * *